United States Patent [19]

Ganz et al.

[11] 4,340,776
[45] Jul. 20, 1982

[54] MODULAR TELECOMMUNICATION SYSTEM

[75] Inventors: Manfred Ganz, Munich, Fed. Rep. of Germany; Enrique Gueldner, Cinnaminson, N.J.

[73] Assignee: Siemens Corporation, Iselin, N.J.

[21] Appl. No.: 199,203

[22] Filed: Oct. 29, 1980

[51] Int. Cl.³ .................. H04Q 3/60; H04L 15/00
[52] U.S. Cl. .................. 178/3; 179/18 ES; 370/88
[58] Field of Search .................. 370/41, 42, 60, 85, 370/86, 88, 89, 95, 104; 178/2 R, 3; 179/18 E, 18 EE, 18 ES, 18 J; 364/900 MS File

[56] References Cited
U.S. PATENT DOCUMENTS

| 4,009,343 | 2/1977 | Markey et al. | 370/104 |
| 4,035,770 | 7/1977 | Sarle | 370/88 |
| 4,129,750 | 12/1978 | Mattern | 370/88 |
| 4,205,326 | 5/1980 | Porter et al. | 370/86 |
| 4,213,201 | 7/1980 | Gagnier et al. | 179/18 EE |

OTHER PUBLICATIONS

"Siemens System EDX–System Description", Jul. 1979, Siemens Aktiengesellschaft, Berlin and Munich, West Germany.

Primary Examiner—Thomas A. Robinson
Attorney, Agent, or Firm—Spellman, Joel and Pelton

[57] ABSTRACT

A modular telecommunication system comprises a plurality of switching blocks and a plurality of inter-connecting lines for interconnecting the switching blocks. Each of the switching blocks includes a multiplicity of line terminators each adapted to be connected to a respective data terminal. A communications controller is provided in each switching block for controlling local data exchange between pairs of line terminators connected thereto across real channels. A virtual channel controller is connected to the communications controller and controls remote data exchange across interconnecting lines via virtual channels between a locally associated data terminal and a data terminal associated with a different switching block. A central processing system is connected to the virtual channel controller and controls setting up switching operations within both the virtual channel controller and the communications controller. Interface units are arranged between the virtual channel controller and a respective one of the inter-connecting lines for providing remote data exchange between data terminals each associated with a different switching block. The virtual channel controller above all is a switching unit for routing information transfers from one of the devices connected thereto to one of the others and is provided with a direction memory for storing address control information for controlling communication links across the virtual channels.

17 Claims, 19 Drawing Figures

FIG. 16

Virtual Channel # Table

| LOCAL VIRTUAL CHANNEL # (MEMORY ADDR.) | 38 | 37 36 | 33 32 | 21 20 | 15 14 | 12 11 | 0 |
|---|---|---|---|---|---|---|---|
| | PARITY | LOCAL IBI # | LOCAL LT # | REMOTE SB # | INFO DISPOSITION | REMOTE VC # | |
| 1 | | | | | | | |
| 2 | | | | | | | |
| ... | FIXED DATA | | VARIABLE ENTRY | | | | |
| 4032 | | | | | | | |

Line Terminator # Table

| LOCAL LINE TERMINATOR # | 25 | 24 | 21 20 | 15 14 | 12 11 | 0 |
|---|---|---|---|---|---|---|
| | PARITY | LOCAL IBI # | REMOTE SB # | INFO DISPOSITION | REMOTE VC # | |
| 1 | | | | | | |
| 2 | | | | | | |
| ... | FIXED DATA | | VARIABLE ENTRY | | | |
| 4032 | | | | | | |

1700 — 1714, 1713, 1712, 1711, 1710

MODULAR TELECOMMUNICATION SYSTEM

BACKGROUND OF THE INVENTION

The invention is related to a modular telecommunication system for providing data exchange between any pair of a multiplicity of data terminals associated with the exchange.

Fully electronic, computer-controlled switching systems for handling digital telecommunications services are already well known. Such switching systems are suitable for use in world-wide telex and gentex networks, set up as public or private data networks or as integrated networks.

A computer-controlled switching system of this type which is known as Siemens system EDX is described in a brochure "Siemens System EDX-System Description", published July 1979 and distributed by Siemens Corp. Iselin, N.J. and which is incorporated herein by reference. The Electronic Data Exchange System described therein consists of modular hardware and software components. The hardware essentially comprises communications hardware, a central processing unit and peripheral equipment. A standard configuration of the exchange system is represented as a block diagram in FIG. 1. The communications hardware connects subscriber lines or trunk lines of a data communication network to the exchange and performs switching-oriented control and through-connect functions. The communications hardware is composed of line terminators LT, terminator group controllers TG and a communications controller CC. Line terminators LT are the electrical interfaces to subscriber lines or trunk lines, and a terminator group controller TG is the logic interface to the communications controller CC. The line terminators LT receive data of various speeds and in different codes, assemble items of data to characters or data words, and present the formatted data to the communications controller CC via a terminator group controller TG.

The communications controller CC is the heart of the communications hardware. It serves as interface between the line terminators LT via the terminator group controller TGC and the central processor CP. The communications controller CC scans up to 4,032 line terminators LT and transfers line status information as well as control information to the central processor CP and control information from the central processor CP to the line terminators LT. The second main function of the communications controller CC is to provide the facilities for transmitting information from one line terminator to another line terminator. The use of this data transfer technique does not load the central processor CP during the call-connect phase and insures a high data through-put rate without internal blocking.

The data exchange system uses central processors of the PDP-11 family of Digital Equipment Corporation for performing the main control functions. The PDP-11/35 model is a 16-bit microprogrammed central processing unit with a central processor bus CP-Bus including bus timing control and bus address registers, a main memory MM, a set of general registers, an internal read-only memory for mircroprograms and an arithmetic logic unit. The central processor controls both communications hardware and device peripherals. For reasons of reliability, the central processor as well as the central parts of the communications hardware and the main peripheral devices are duplicated.

The device peripherals perform auxiliary functions for both central processors and provide storage facilities and man/machine interfaces for system control. These devices are largely concerned with high-speed communication of data to the computer memory. Vital peripherals are, for example, a bus link BL which is a high speed, half duplex data transfer channel connecting the two central processors via the buses. It consists of two general purpose direct memory access (DMA) bus interfaces and transfers words or blocks of data between the central processor memories. Thereby status and control information from the on-line central processor is transmitted to the stand-by central processor and vice-versa. Other peripherals are a console typewriter, a supervisor's teleprinter, disk memories backing up the main memory for storing all on-line programs and buffered call blocks, and input/output peripherals. Programmable Switches PS allow a single peripheral or a group of peripherals to be switched from one bus to another. These programmable switches can be accessed by only one central processor at a time. The programmable switches are designed to disconnect themselves from a bus that is no longer operative and to regenerate all bus signals passing through the switch.

These hardware modules are supported by software modules comprising an operating system and a maintenance system. There are software modules for performing internal coordination, system safeguarding for ensuring interworking between the two computer systems in the exchange with hard stand-by capability for controlling of computer peripherals and of switching-oriented operations. A control system is the central and control oriented part of the operating system, and accomplishes control functions concerning program execution, input/output operations to and from peripheral devices and is responsible for safeguarding. Switching programs perform all functions for switching-oriented operations. They control all phases of a call set-up from the initial call request through the call-connect phase to final clear down and disconnect. Further modules are used program library updating, data conversion between peripheral devices and for other functions such as for program preparation.

When a call is initiated, the coupled line terminator LT detects the call request and sends it via the communications controller CC to the central processor CP. The central processor CP controls the set-up phase and stores all dynamic information necessary for call handling.

The calling party, when enabled, sends selection information which is analyzed by a central processor routine using routing tables to determine an outgoing line to the called party. The central processor CP proceeds in controlling the connection to the called party and switches the call through by entering address information into a memory provided in the communication controller CC. During the following call-connect phase data are transferred from line terminator to line terminator under the control of the communications controller CC. The central processor CP is not involved in handling the data transfer during the call-connect phase.

A call disconnect can be initiated by either party in sending a clearing signal which, is transmitted to the central processor CP. Thereupon, the central processor CP again takes over the control for the clear down of the call. It communicates with both parties involved in that call and invalidates status information in the memory of the communications controller CC. After a guard delay time line terminators LT are left in a condition which allows the lines to be seized at any time.

Evidently, the known system has a distinctive distribution of workload which is shared by line terminators LT, the communications controller CC and the central processor CP. The control of the data exchange system by the microprogrammed central processing system grants a high reliability, since it is implemented as a dual system with hot stand-by capability and offers great flexibility of use with public and private teleprinter and data networks such as terminal exchanges, transit exchanges, international gateway exchanges, and a PABX for direct-connection mode. The configuration of this sytem, however, has one constraint: in a full size configuration the system is restricted to 64 terminator groups, each group consisting of 64 line terminators. This is only the theoretical capacity, since one line terminator LT of each terminator group is reserved for testing purposes of the terminator group, thus the capacity in fact is restricted to 4,032 line terminators LT.

If higher capacity is required, the system can be expanded, as it is schematically indicated in FIG. 1, by an interlink system. This interlink system comprises a system bus S-BUS having an interface arranged between the bus and communications controllers CC of a basic system. The structure of the basic system necessitates to interpret this interface unit as one of the 64 terminator groups which can be associated with the dual communications controllers CC of the basic system. This means that each of both basic systems connected by such an interlink system would be further limited in their capacities and an expanded exchange system composed of two basic systems would have only a theoretical capacity of not more than 7,938 line terminator connections.

SUMMARY OF THE INVENTION

The present invention is based upon a modular telecommunication system for exchanging data between any pair of a multiplicity of data terminals which system has exchange modules including one group of data terminals and a switching block. Each of the switching blocks is provided with a communications controller for controlling local data exchange between pairs of line terminators connected to respective data terminals across real channels. Furthermore, there is arranged in each switching block a central processing system supporting a communications controller in setting up switching operations. All switching blocks are connected by interconnecting lines via a respective interface unit for providing remote data exchange between data terminals associated with different switching blocks.

It is an object of the present invention to improve such a modular telecommunications system in order to provide expanded switching capacity for serving more than the limited number of data terminals comprising subscriber or trunks linked to one switching block, i.e. which can be connected by a conventional electronic data exchange system.

Another object of the present invention is to provide such an improved modular telecommunication system which includes a plurality of switching blocks, i.e. conventional electronic data exchange systems, in such a manner that these switches form exchange modules which are each associated with a group of data terminals and which are connected to each other by interconnecting lines for exchanging data between data terminals belonging to different data terminal groups without affecting the switching capabilities for local data traffic.

Still another object of the present invention is to provide such an improved modular telecommunication system having expanded switching characteristics which are mainly based on the switching routines of the conventional data exchange system and which allow to establish an expansion of installed systems by adding further switching blocks without redesign of the system.

Still another object of the present invention is to provide such an improved modular telecommunication system utilizing additional signalling routines for switching operations which comply with routines of the conventional data exchange system.

These objects, as well as other objects which will become apparent in the discussion that follows, are achieved according to the present invention by an improvement which comprises a virtual channel controller being arranged in each switching block for controlling remote data exchange between local data terminals and a respective data terminal associated with a remote switching block.

The virtual channel controller is connected to the central processor system, the communications controller, and the interface unit and controls switching information from one of these units to another one. It is designed such that it is transparent for local switching operations across real channels and it establishes data links by means of virtual channels for data exchange between locally associated data terminals and data terminals associated with a respective one of the remote switching blocks across the set of interconnecting lines.

The main characteristic of the virtual channel controller is that it does not interfere with switching operations for local data traffic, thus all normal control routines which include control information transfers between the communications controller and the central processing system can be performed despite the fact that this communication is channeled through the virtual channel controller. Furthermore, the central processing system easily can be adjusted also to control switching operations referring to inter-system communications, since viewed from a local switching block such data exchange just is performed across another group of channels, the so-called virtual channels. For the central processing system such expanded switching capability simply means that it has to control data transmission across two groups of channels, either the real channels or the virtual channels. As conventional, the central processing system controls all procedures during a call set-up phase which are necessary to establish the temporary communications links across the real channels. The central processing system during this phase supplies the communications controller with all the information necessary for handling independently data exchange with locally associated data terminals during the call-connect phase.

Accordingly, the central processing system in case of inter-system communication establishes a communication link between a virtual channel and a respective real channel associated with the local data terminal requesting a call. This virtual channel is the communications link to another switching block of the exchange system utilizing interconnecting lines. Viewed from the local switching block, such a virtual channel is nothing else but another channel to a data terminal with the exception that the respective data traffic across such intersystem communications links cannot be handled locally without support of a remote switching block.

Switching operations during the call-connect phase are controlled by the virtual channel controller which received from the central processing unit all the necessary control information during the respective call set-up phase. This is accomplished such that in case of an inter-system communication, after completing the call set-up phase the communications controller is still left in a set-up mode which means that this unit still is operated as if to all information received from the locally associated data terminal is transferred to the central processing system. The virtual channel controller during the call-connect phase intercepts such data transfers and channels the data not to the central processing system but to the designated interface unit connecting the switching block to the interconnecting lines.

This system arrangement allows all local data traffic and respective switching operations to be handled and controlled in a conventional manner, since the virtual channel controller in such a case is inactive insofar that it does not intercept data traffic between the communications controller and the central processing system. The principle control characteristic of the central processing system also remains unchanged, since it is activated—as conventional—by each call request and is released after performing the switching operations of the call set-up phase. As conventional, the central processing system then is available for being activated by another call request. This system structure makes use of conventional characteristics in a very advantageous manner in an expanded system which basic characteristic is decentralized control of performing switching operations for a great multiplicity of data terminals. The modularity of this system applies to two degrees of liberty: the installed number of interconnecting lines and the used number of switching blocks. Both groups can be expanded separately depending on traffic requirements of a specific application and growing load of already installed systems.

Further advantages and design characteristics will become apparent from the following discussion of preferred embodiments.

BRIEF DESCRIPTION OF THE DRAWINGS

A better understanding of invention may be had by reference to the following description of the preferred embodiments in conjunction with the accompanying drawings.

FIGS. 16 and 17 show formats of entries of respective tables, the virtual channel number table and the line terminator number table of the direction memory.

DETAILED DESCRIPTION OF THE PREFERRED EMBODIMENT

Structure of the Exchange System

Figure 2:
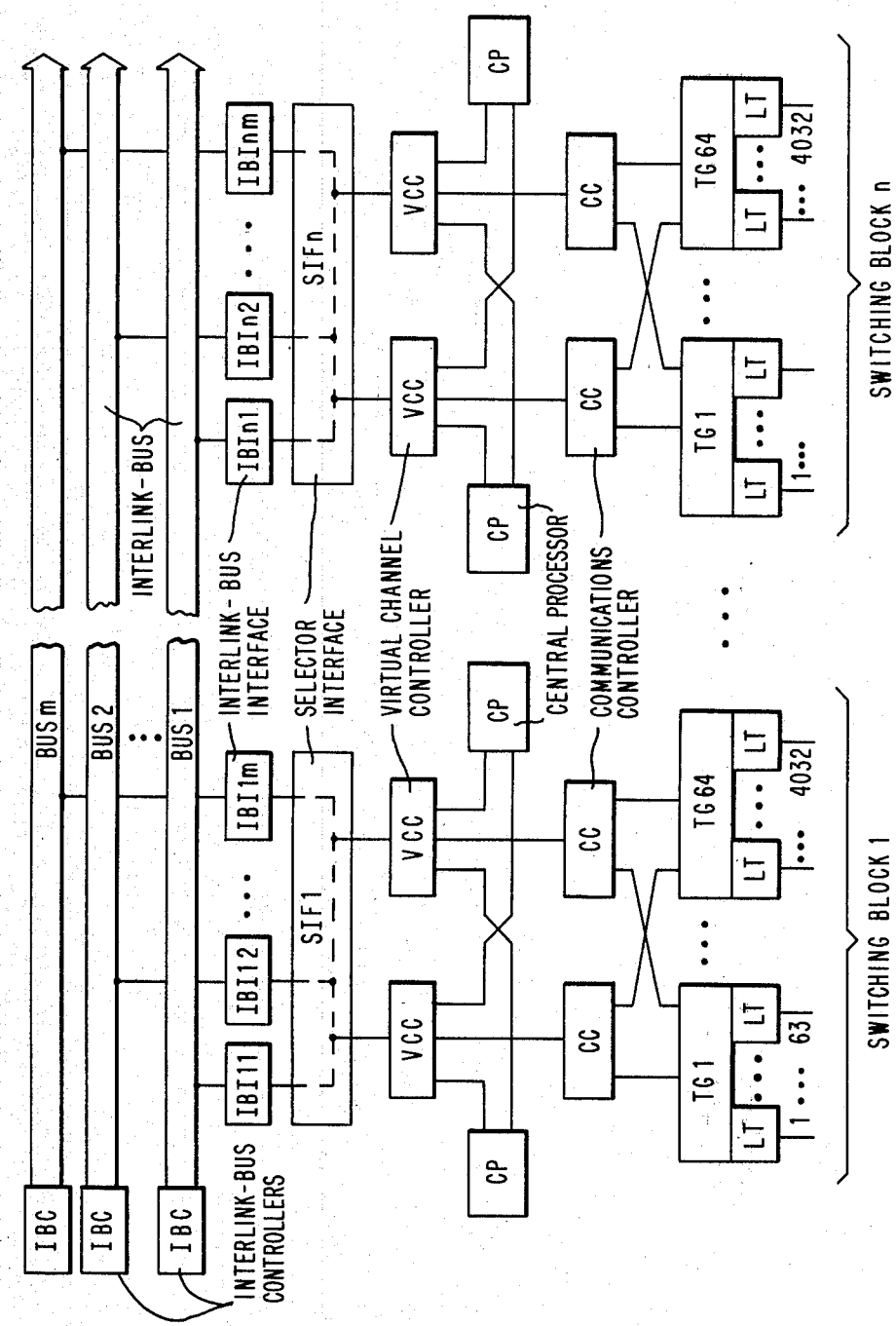
FIG. 2 shows an expanded digital exchange system according to the present invention including several switching blocks which are interconnected by an interlink-bus system via interlink-bus interface units under control of a respective virtual channel controller arranged in each switching block.

The block diagram of an expanded electronic data exchange system shown in FIG. 2 represents basic modules of the same exchange system including n switching blocks SB1 . . . SBn. Each switching block SB represents a conventional exchange system as described in the "Background of the Invention" with some additional hardware as required for inter-system communication across interlink-buses BUS1 . . . BUSm.

Line terminators LT within the switching block, again represent the electrical interface to external subscriber and trunk lines. From these sources a line terminator LT receives data in bit-serial form at various speeds and in various codes, converts the data into bit-parallel characters and presents it character by character to the communications controller CC via the terminator group controller TG. The communications controller CC serves as the interface between the line terminators LT and the central processor CP of the switching block during a call set-up phase. It scans up to 4,032 line terminators LT consecutively and transfers line status reports, control information and data to the central processor CP and vice versa as with the conventional exchange system described. It controls local data transfer between different line terminators LT of a switching block SB during the call-connect phase.

The communications controller CC, also a module of the conventional data exchange system, is not enabled to handle inter-system communication between destination lines each associated with a different switching block. For the same communication another control unit, the so-called virtual channel controller VCC is utilized. The virtual channel controller VCC of a switching block is the interface between the associated communication controller CC, the central processor CP and a bus-oriented device which may be called a switching block coupler. The switching block coupler is composed of interlink-bus interface units IBI, interlick-bus controller units IBC and interlink buses BUS as illustrated in FIG. 2. The virtual channel controller VCC comprises, as will be described later in detail, a memory, control logic and data switches to control the exchange of information among the communications controller CC, interlick-bus interface units IBI and the central processor CP. Whereas the virtual channel controller VCC is considered part of the switching block, the units of the switching unit coupler may be located in cabinets separated from a particular switching block within a limited distance of several hundred feet. It may be noticed that the control modules of a switching block, the communications controller CC, the central processor CP and the virtual channel controller VCC are duplicated for obtaining fail-safe operation. The arrangement of each of these hardware components is such that the respective component can assume one of four possible system states: on-line, stand-by, off-line and test. In the on-line mode the module is in charge of associated control functions; in the stand-by mode the module is operable and, if required can immediately take over the functions of the corresponding currently on-line module. For this purpose memories of the modules are constantly updated by the on-line central processor to the same level as the respective memory of the on-line module. In the off-line mode, a communications controller CC, for example, can be used for testing off-line terminator groups TG with the aid of the off-line central processor CP. In the test mode, the virtual channel controller VCC and the communications controller CC are tested by means of diagnostic programs. In this state, the communications controller CC, for example, is totally isolated from terminator groups TG.

As indicated in FIG. 2, the switching block coupler unit comprises a variety of independently operated interlink buses BUS1 to BUSm. The number m of buses BUS is to be chosen dependent on traffic conditions within the entire system and the required amount of fail-safe operation. Because of a variety of applications for such an expanded system, a fixed relation between the numbers of switching blocks n and the number m of interlink buses BUS cannot be determined unrelated to a specific application. However, since basically none of these interlink buses BUS is fixedly associated with one switching block, it can be stated that sufficient redundancy of the entire system is achieved even if the number n of switching blocks exceeds the number m of interlink buses. Each switching block is associated with an interlink-bus interface unit IBI each interfacing a different interlink-bus BUS. There are no pre-allocated communication links between switching blocks. In general, all links are set up dynamically on a protocol basis, thus, the number of communication links active between any pair of switching blocks is determined by instantaneous traffic conditions. The interlink bus system together with the individual interlink bus controllers IBC and the interlink-bus interface unit IBI are arranged in one unit, the switching block coupler, remote from the switching blocks. The different interlink buses can be composed of one multi-layer circuit board forming the rear panel of the same unit. The interlink-bus interface units IBI are plugged onto this circuit board and thus directly connected to a respective one of the interlink buses.

Since the operative virtual channel controller VCC of each switching block may use each associated interlink-bus interface unit IBI for inter-system communication, there is arranged a selector interface SIF between both virtual channel controllers VCC of each switching block and the corresponding group of interlink bus interfaces. This selector interface determined for selecting a respective one of the group of associated interlink-bus interface units IBI is not a part of the switching block coupler rather spatially associated with the virtual channel controllers VCC and may be understood as the interface of these controllers to the respective interlink bus interface IBI. Nevertheless, in FIG. 2, the selector interfaces are shown as separate units for better comprehension.

Having described the structure of the data exchange system with reference to FIG. 2 in general, detailed composition and operation of the units of the same system will be depicted in the following. It may be noted that in the following description of details of the exchange system, data lines are drawn in full lines whereas control signal lines are shown in broken lines for the reason of better comprehension.

Interlink Bus

Figure 3:
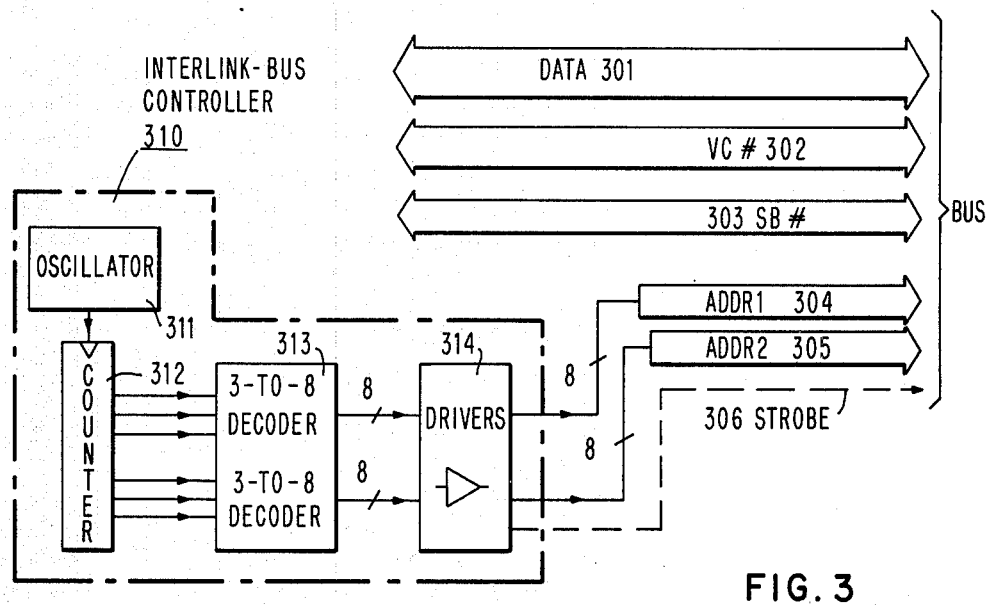
FIG. 3 shows schematically the composition of an interlink bus including information lines and control lines connected with an interlink-bus controller.
Figure 4:
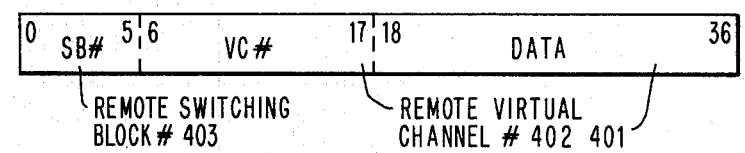
FIG. 4 shows the data format of information transferred across an interlink bus.
Figure 4:
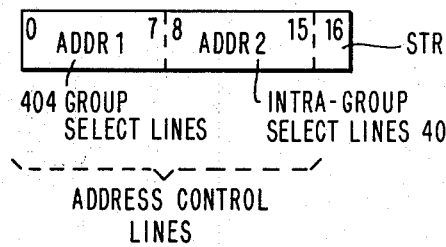

FIG. 3 shows the principal arrangement of an interlink bus BUS which will be explained in combination with FIG. 4 showing for one preferred embodiment the format of data transmitted across the interlink-bus BUS. In this embodiment, it is assumed that the switching block handles 4,032 communication lines and comprises correspondingly 4,032 line terminators LT which are arranged in 64 groups each controlled by a terminator group controller TG. These communication lines may also be designated as channels. In addition to these real channels, it is assumed that each switching block may also be able to handle the same amount of so-called virtual channels which channels are used for interlink communication. Thus, each virtual channel corresponding to a real channel is to be interpreted as communication line to a remote switching block. Furthermore, it is assumed that the maximum configuration of a system comprises 63 switching blocks which are interconnected by up to m=15 interlink buses BUS1 through BUS15.

Based upon these assumptions, an interlink bus as evident from FIG. 3 is composed of four groups of parallel lines: data lines 301, virtual channel address lines 302, switching block address lines 303, and address control lines 304 and 305. Finally, each interlink bus BUS comprises a strobe line 306. The corresponding structure of the data format is shown in FIG. 4. For the reason of better comprehension, the different groups of data fields are shown in two lines. The top line contains three fields: a 19 bit field 401 having a length corresponding to the number of data lines, a 12 bit field 402 for a remote virtual channel number addressing one of the 4,032 remote virtual channels, and a 6 bit field 403 for a remote switching block number for addressing one of 63 remote switching blocks. The bottom line refers to the group of address control lines 304, 305 and 306 of the interlink bus and comprises eight group select lines 404, eight intra-group select lines 405 and the strobe line 406. These address control lines are connected to the interlink bus controller 310 selecting in consecutive time slots a respective one of the switching blocks via a respective one of the interlink-bus interface units IBI. There is established a hard-wired selecting scheme for the switching blocks. As described, the entire data exchange system shall be composed of up to 63 switching blocks which are separated into eight groups each comprising up to eight switching blocks or interlink-bus interface units IBI, respectively. Correspondingly by one of the eight group select lines one of these eight groups of switching blocks is determined. Additionally, the eight intragroup select lines carry selector information designating a specific switching block or interlink-bus interface unit IBI within each group.

Let it now be assumed that the bus speed should be 1 M characters/s to determine a bus cycle time. This bus speed is controlled by an oscillator 311 arranged in the interlink bus controller 310. The oscillator feeds a six bit binary counter 312 having outputs connected to a decoder unit 313 which is composed of two commercially available 3-to-8 decoder elements. This decoder unit 313 is connected by two groups of eight outputs to a line driver stage 314 formed of 16 conventional driver circuits each connected to one of the 16 address control lines 304 and 305, respectively. Only one line of the group select lines 304 and one line of the intra-group select lines 305 carries a selecting signal during a cycle time interval determined by the enabled status of respective line drivers of the line driver stage 314. Within each cycle time interval the strobe signal is fed to the strobe line 306 specifying a data enable condition thereby enabling the currently addressed interlink-bus interface unit IBI to access the interlink bus and to receive information sent across data lines 301. The individual units of the interlink bus controller 310 are of conventional design and composed of commercially available components, such as for example decoder unit 313 which is composed of two components #74155. Further detailed description of the interlink bus controller 310 therefore does not seem to be necessary.

Interlink-Bus Interface Unit

Figure 5:
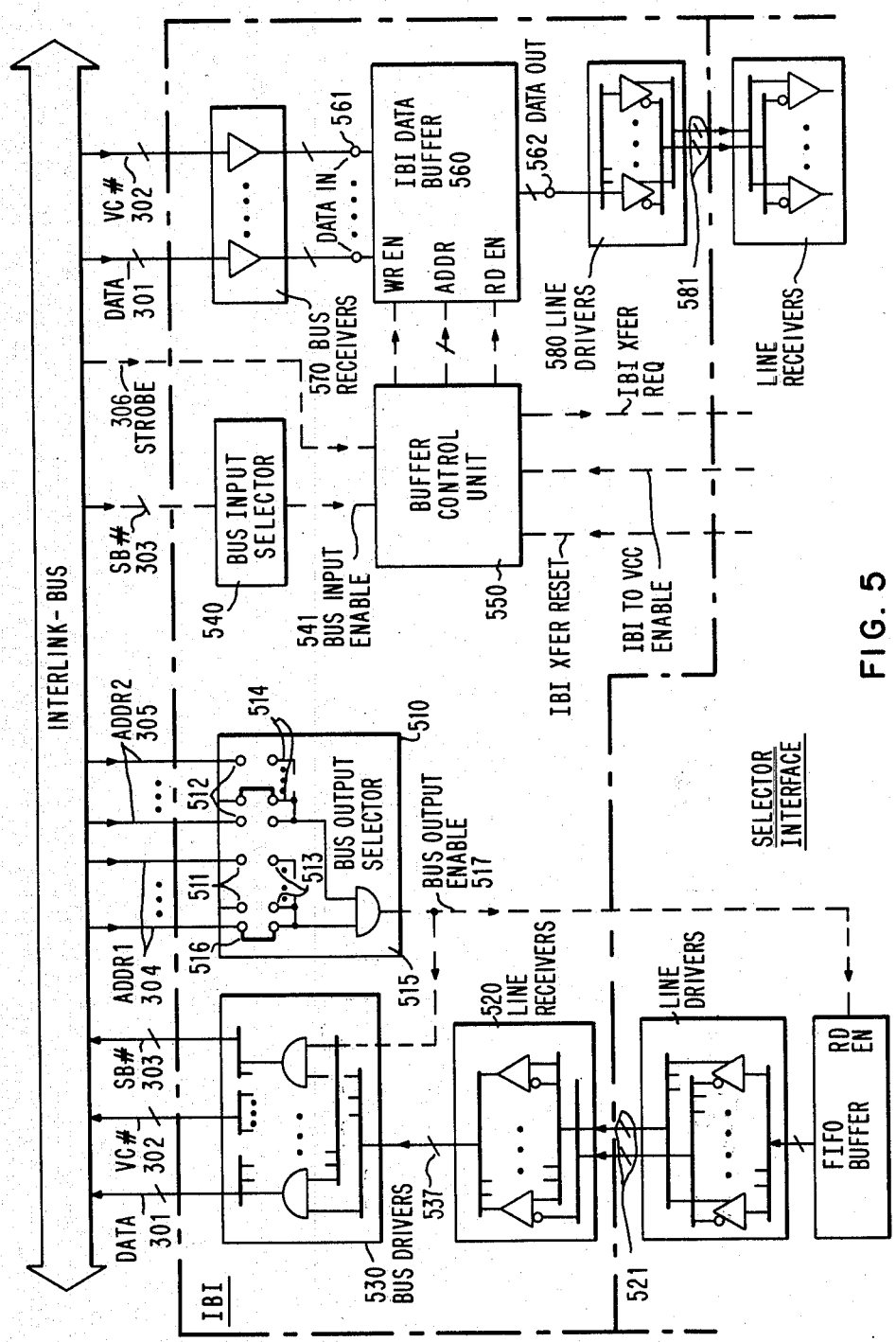
FIG. 5 represents a more detailed block diagram of an interlink-bus interface unit which is arranged between each interlink bus and a respective one of the switching blocks.

Having described the structure of an interlink-bus and the addressing scheme, the interlink-bus interface unit IBI will now be depicted with reference to FIG. 5 showing the composition of an interlink-bus interface unit IBI and its surroundings. The interlink-bus interface unit is the connecting unit between a switching block SB and one interlink bus of the interlink-bus system for transmitting information in both directions. It is the connection link between a high speed bus system and a remote switching block having a lower data transfer rate. Because spatial requirements of such a large data exchange system demands for data transmission lines of a length which may not be neglected, since this length is between 300 and 500 feet. Based upon this range of length of physical cables and the capabilities of the virtual channel controller VCC which is an additional restraint, it is assumed that the data transfer rate of up to 0.1 M characters/s between a switching block and associated interlink-bus interface units IBI can be achieved with well known technology at reasonable cost.

The interlink-bus interface unit IBI now is the transmission link between independent units of a data exchange system which are operating at different data transfer rates and has to meet respective requirements. It is composed of two main parts: facilities for transmitting information on to the interlink-bus BUS and facilities for receiving information from the interlink bus BUS. Referring first to the bus output circuitry, there is arranged a bus output selector 510 having two groups of eight inputs 511 and 512 which are connected with the group select lines 304 and the intra-group select lines 305, respectively. Associated with each of these inputs there are arranged in the bus output selector 510 internal connectors 513 and 514, respectively. Each group of these internal connectors is commonly connected and is fed to a respective input of an AND-gate 515. Furthermore, one of the inputs 511 and 512 is connected by jumper 516 to a respective one of the internal connectors 513 and 514. The position of each of these jumpers 516 determines one line out of the group select lines 304 and another line out of the intra-group select lines 305 to be coupled to the AND-gate 515. Whenever, these two through-connected select lines carry select signals, an output signal of the AND-gate 515 designated as a bus output enable signal 517 will be generated. The "ON" condition of this signal determines the select mode of the interlink-bus interface unit IBI, i.e. the interface unit is currently scanned by the interlink bus controller IBC.

The interlink-bus interface unit IBI when selected by the respective interlink bus controller IBC has access to the interlink bus BUS for transmitting information. Such information is received from the associated switching block via the selector interface unit SIF across an output transmission line 521. According to the data format described with reference to FIG. 4, the transmission line is composed of 37 wire pairs for transmitting of one character or information word in parallel. Accordingly the interlink-bus interface unit IBI is provided with a group of 37 line receivers 520 composed of balanced differential receivers, commercially available components, which are arranged in parallel, as schematically shown in FIG. 5. At the remote end of the output transmission line 521 a corresponding number of line drivers is arranged at the output side of the selector interface SIF.

Facing the interlink bus BUS a corresponding unit of bus drivers 530 is arranged which is composed of 37 driver elements arranged in parallel and each connected to one of the outputs of the line receivers 520. The outputs of these bus drivers are each connected to a respective wire of the interlink bus BUS to feed onto the bus data and address information in parallel. As schematically shown in FIG. 5, the bus drivers 530 are controlled by the bus output enable signal 517, i.e. bus drivers 530 are switched into operative condition whenever the bus output enable signal is in its "ON" condition.

A word fed in parallel onto the bus has to be transmitted to only one of the switching blocks, i.e. to one of the interlink-bus interface units IBI which is linking this bus to the respective switching block. Since the receiving interlink-bus interface unit IBI has not been pre-allocated, an addressing scheme different to the selecting scheme is implemented. Such address information may be given by the switching block number SB# which is transmitted along the interlink bus BUS and is received by the bus input circuitry of the interlink-bus interface unit including a bus input selector 540 composed of two 3-to-8 decoders. Each decoder similarly to the decoders of the interlink bus controller IBC has eight outputs which may be designated as group select outputs and intragroup select outputs, respectively. These outputs when inter-connected in similar design as has been described with reference to the bus output selector 510 produce a bus input enable signal 541. This signal specifies the interlink-bus interface unit IBI to be selected for receiving information from the interlink bus BUS.

It should be noticed that this addressing scheme for both directions has the advantage that each interlink-bus interface unit not withstanding its later position in the entire data exchange system can be manufactured identically, since the jumpers 516 can be plugged in at a time when the system is assembled. The allocation of interlink-bus interface units can also be re-arranged simply by changing the position of the respective jumpers.

In the input transmission path of the interlink-bus interface unit IBI there is arranged an IBI data buffer 560 and associated with it a buffer control unit 550 which receives the bus input enable signal 541 and the bus strobe 306 from the interlink-bus BUS, on the one hand, and several control signals from the virtual channel controller VCC via the selector interface SIF, on the other hand. Between the interlink-bus BUS and data inputs 561 of the IBI data buffer 560 there are provided bus receivers 570 which are connected in parallel to bus lines 301 and 302 for receiving data and the virtual channel number. Accordingly, at the output side of the interlink-bus interface unit there are arranged line drivers 580 connected between data outputs 562 of the IBI data buffer 560 and an input transmission line 581.

IBI Data Buffer

Figure 6:
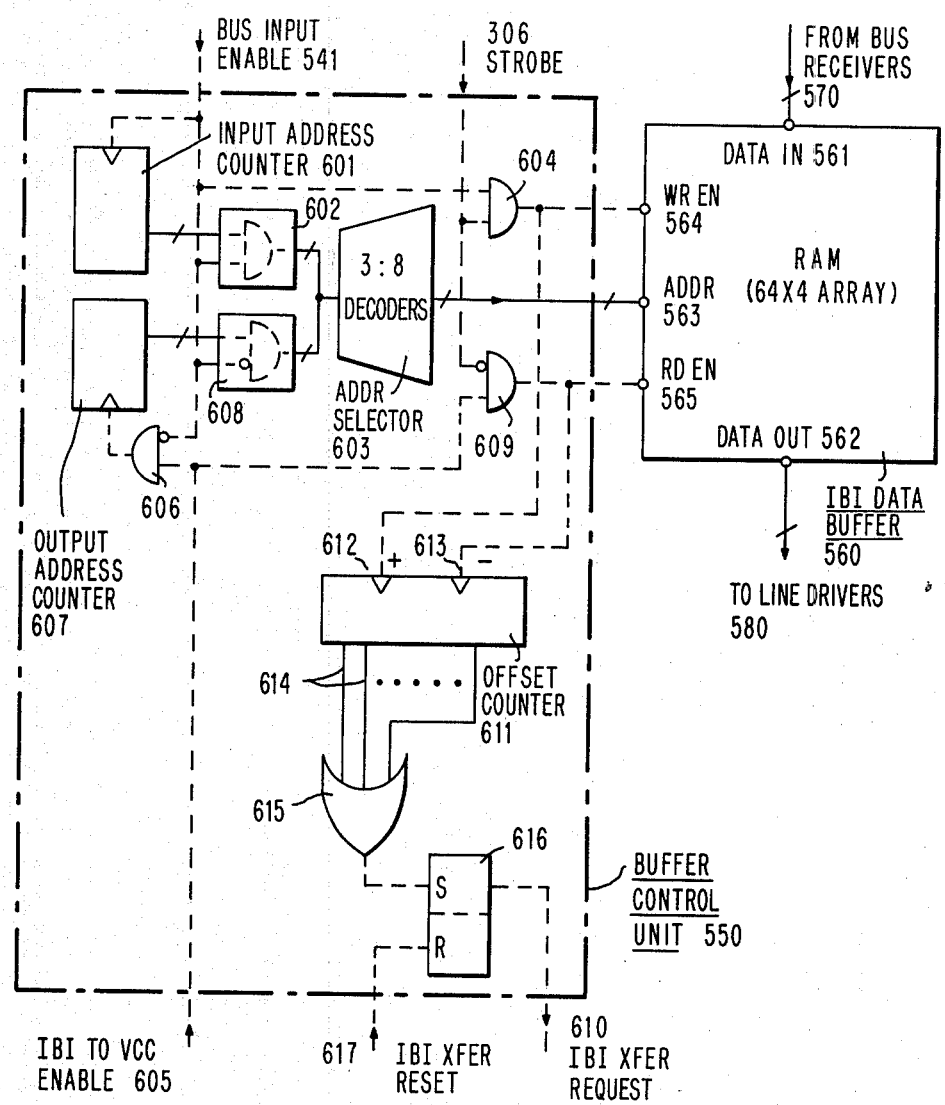
FIG. 6 represents a more detailed block diagram of a data buffer arranged in an interlink-bus interface unit and a buffer control unit for controlling read/write operations from and to the data buffer.

Details of the buffer control unit 550 and the IBI data buffer 560 are represented in a block diagram shown in FIG. 6. The IBI data buffer is a buffer memory of a "First-In-First-Out" (FIFO) type. It has a storage capacity of 4K characters, each character comprising a format of 31 bits. Since there are no FIFO elements commercially available which allow intermediate storage of such an amount of characters, the IBI data buffer in a preferred embodiment is organized as a random access memory composed an array of 64×4 of storage elements of appropriate storage capacity, for example, of components AMD#2143.

Read operations into the IBI data buffer 560 for intermediate storage of information transmitted along the interlink bus and write operations from the IBI data buffer for transmitting information to the associated virtual channel controller VCC are controlled by the buffer control unit 550. For starting a write operation into the data buffer, the buffer control unit is supplied with two control signals, the bus input enable signal 541 and the bus strobe signal 306. The bus input enable signal 541, as has been described with reference to FIG. 5, designates the selected mode of the interlink-bus interface unit IBI. The bus strobe 306 defines a time period within a cycle time interval of the interlink bus BUS wherein transmitted data is valid for storing in the IBI data buffer. For simulating FIFO operations in the RAM-oriented data buffer the bus input enable signal 541 is fed to a clock input of an input address counter 601 which is conventionally designed as a binary ring counter. The counter capacity corresponds to the capacity of the IBI data buffer 560; a present count represents the current write address for the IBI data buffer. As schematically shown in FIG. 6, each of the outputs of the input address counter 601 is connected to a respective first input of AND-gates 602. Second inputs of these AND-gates are connected with the signal line carrying the bus input enable signal 541. The outputs of AND-gates 602 are connected in parallel with respective inputs of an address selector 603 composed of 3-to-8 decoder elements for establishing the address of a memory location of the IBI data buffer into which location the information currently transmitted along the interlink bus BUS has to be stored.

Thus, having selected the buffer address the write operation can be started. This is performed by a write signal fed to a write enable input 564 of the IBI data buffer. This write signal is the output signal of a further AND-gate 604 having inputs which are connected to the lines carrying the bus strobe signal 306 and the bus input enable signal 541, respectively.

For read operations a similar design is used. Read operations from the IBI data buffer 560 are started under control of the receiving virtual channel controller VCC. After having received from the interlink-bus interface unit IBI a request signal IBI XFER REQ 610 which will be described later in detail the virtual channel controller VCC responds to that request as soon as it can perform the requested operation. At this time, the virtual channel controller VCC sends a transfer enable signal "IBI to VCC ENABLE" 605 to the buffer control unit 550. This signal is received at a first input of a further AND-gate 606 having an inverted second input which is supplied by the bus input enable signal 541. The output of this AND-gate 606 is connected to a clock input of an output address counter 607 which corresponds in design and operation to the input address counter 601. The output address counter 607 produces a new address incremented by one whenever an "IBI to VCC ENABLE" signal 605 is received in the buffer control unit and the interlink bus interface unit 550 is not selected for a write operation concurrently. This corresponds to the condition that a write operation into the IBI data buffer 560 has priority over a read operation from that buffer.

The reasons for this priority scheme are two-fold: the data transfer rate across the interlink bus BUS is about ten times higher than the data transmission rate between the interlink-bus interface unit IBI and the virtual channel controller VCC and information transmitted across the interlink bus has to be received within the valid period of the bus cycle time otherwise this information is lost.

The current count of the output address counter 607 represents the present address for a read operation from the IBI data buffer 560. Similarly, to the design for decoding a write address, each of the outputs of the output address counter 607 is connected to a respective first input of further AND-gates 608. Inverted second inputs of the AND-gates 608 are connected to the signal line carrying the bus enable signal 541. Each of these outputs of the AND-gates 608 being commonly connected with a respective one of the outputs of the AND-gates 602 is coupled to an input of the address selector 603 for generating the address of a memory location of the IBI data buffer 560 from which location the stored character is read out to the line drivers 580.

This read operation is performed as soon as a read enable input 565 of the IBI data buffer 560 receives a read enable signal from a further AND-gate 609 which is connected by a first input to the signal line 605 carrying the signal "IBI to VCC ENABLE" 605. An inverted second input is supplied by the bus strobe signal 306. A read operation thus is started whenever the associated virtual channel controller VCC is enabled to receive data from the interlink-bus interface unit IBI and this unit is not selected for a write operation.

Information temporarily stored in the IBI data buffer 560 has to be transmitted as soon as possible to the associated virtual channel controller VCC. The interlink-bus interface unit IBI has to instruct the associated virtual channel controller VCC about this condition which is achieved by the IBI transfer request signal "IBI XFER REQ" 610. For generating this signal whenever the IBI data buffer 560 is not empty an offset counter 611 is used. This counter being designed as a forward-backward counter has a count-by-one input 612 for counting in forward direction which input is connected to the output of the AND-gate 604 supplying the write enable signal generated at the output of AND-gate 604. The count of the offset counter 611 is incremented by one whenever a write operation into the IBI data buffer 560 is performed.

Correspondingly, a second count-by-one input 613 for decrementing the count of the offset counter 611 is connected to the output of the AND-gate 609 supplying the enable signal for a read operation from the IBI data buffer 560. Thus, the offset counter 611 presents at parallel outputs 614 the current load of the IBI data buffer 560. The outputs 614 of the offset counter are connected in parallel with respective inputs of an OR-gate 615 generating an output signal whenever the offset counter 611 presents a non-zero value. The output of the OR-gate 615 is connected with a set input of a transfer request flip-flop 616 generating the signal "IBI XFER REQ" 610 in the set condition.

As will be described later in detail, the virtual channel controller VCC generates a control signal "IBI XFER RESET" 617 after having responded to a request of an interlink bus interface unit IBI for transmitting data to the virtual channel controller VCC. This signal 617 is supplied to the reset input of the transfer request flip-flop 616. The transfer request flip-flop 616 will be set again immediately, if in accordance to the count of the offset counter 611 one or more characters still have to be transmitted to the virtual channel controller VCC.

Selector Interface Unit

In the description of the basic structure of the expanded data exchange system with reference to FIG. 2, it has been pointed out that both the operative and the stand-by virtual channel controller VCC of one switching block have to communicate with a plurality of interlink-bus interface units IBI. As shown in FIG. 2, switching block SB1 is associated with interlink-bus interface units IBI 11 to IBI 1m which are the individual links to the different interlink buses BUS1 to BUSm. For selecting a communication link between the operative virtual channel controller VCC and an individual interlink-bus interface unit IBI there is arranged the selector interface SIF between both virtual channel controllers VCC of a switching block and the associated group of interlink-bus interface units IBI. Design details of the selector interface will now be described with reference to FIG. 7 showing a block diagram of such a selector interface SIF in detail and surrounding devices, i.e. the virtual channel controllers VCC and the interlink-bus interface units IBI.

Figure 7:
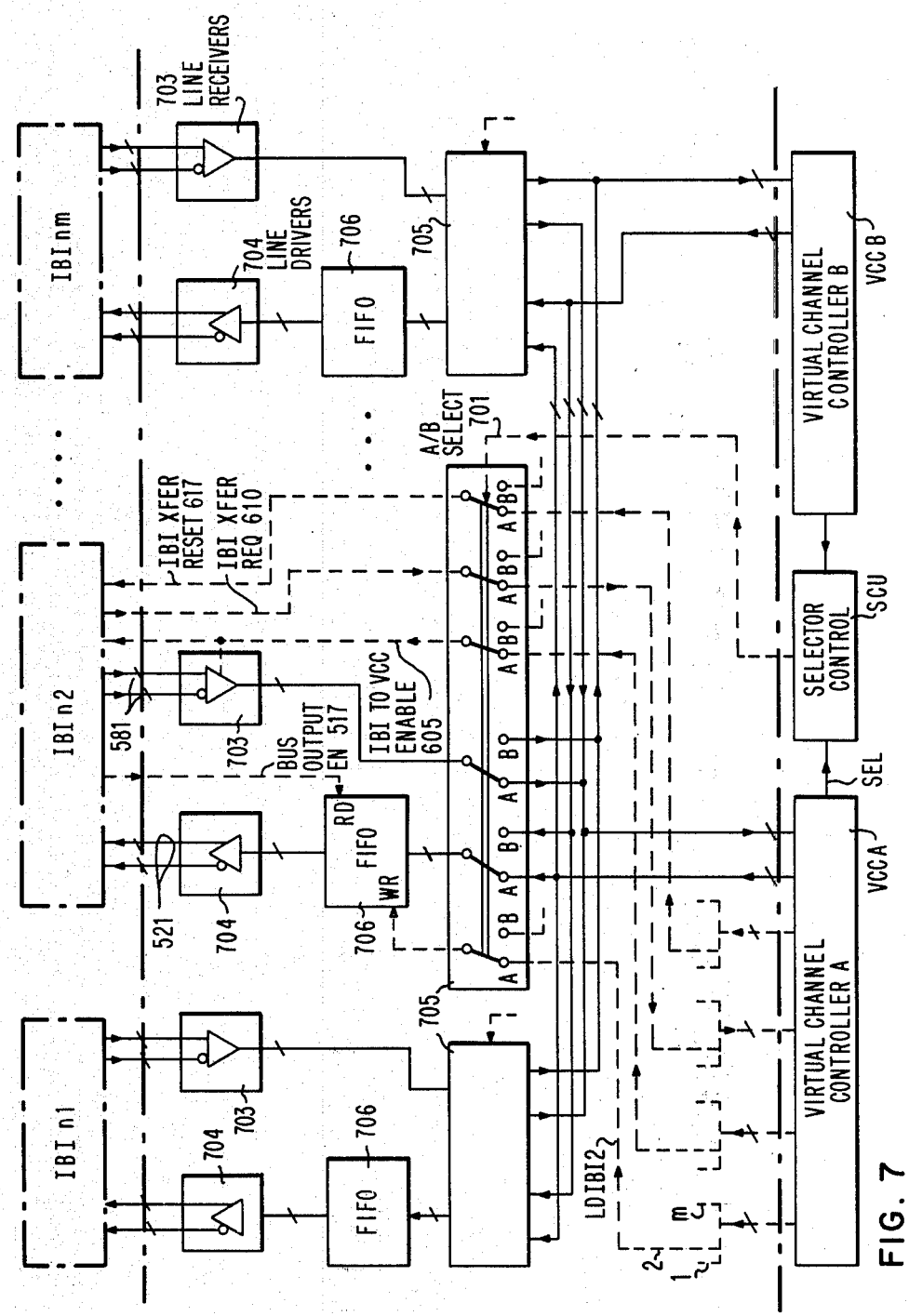
FIG. 7 shows a selector interface unit arranged between the virtual channel controller of a switching block and a group of interlink-bus interface units which are associated with one switching block.

On top of FIG. 7 there is schematically indicated the group of interlink-bus interface units IBIn1 to IBInm associated with an n-th switching block SBn. In the bottom line correspondingly both virtual channel controllers VCC A and VCC B of this switching block SBn are schematically indicated. In between both virtual channel controllers VCC A and VCC B there is arranged a selector control unit SCU. The selector control unit SCU receives a select signal SEL from the virtual channel controller which is presently in operative mode. Responsive to that control signal the selector control unit SCU delivers an A/B select signal 701 to the selector interface. A group of further control signals which are important for the operation of the selector interface SIF comprises load strobes "LD IBI n" designating an individual interlink-bus interface unit, for example, IBI n2 which is selected by the load strobe LD IBI 2 as indicated. These signals determine which one of the associated interlink-bus interface units IBI n1 to IBI nm shall be selected by the selector interface SIF. Evidently, the selector interface has to establish a communication link between one of two virtual channel controllers VCC A or VCC B, on the one hand, and one interlink-bus interface unit, on the other hand.

Depicting now details of the selector interface SIF the following description just refers to the communication link between the virtual channel controller VCC A assumed to be operative and the second interlink-bus interface unit IBI n2 as an example. Accordingly FIG. 7 represents design details of this communication link. Communication links between the other devices, since being identical, are just schematically indicated in FIG. 7. The input/output side of the selector interface SIF facing the interlink-bus interface unit IBI n2 represents the remote end of the transmission line for transmitting information to the interlink-bus BUS via the interlink-bus interface unit and for receiving information from the bus. The signal groups which are transmitted in either direction have been described in detail with reference to FIG. 5. Corresponding to line drivers and line receivers located in the interlink-bus interface unit there are provided line receivers 703 and line drivers 704 which are just shown schematically. They are connected with information transmission lines drawn in full lines. Evidently, several control signals also have to be transmitted between the virtual channel controller VCC A and the associated interlink-bus interface unit IBI n2 along control lines which are shown in broken lines. It is clear that for the reasons set forth above that for transmitting these control signals also identical line drivers and line receivers, respectively, have to be provided which are not shown for simplification.

All these signals are channeled in parallel through a switching unit 705 which is controlled by the A/B select signal 701. The switching unit 705 is schematically shown as being composed of mechanical toggle switches also for the reasons of simplification. It may be understood that these switches, as it is now conventional in designing electronic units, in fact will be composed of transistorized switches. Dependent on the state of the A/B select signal 701 all these swiches in common will either connect a connctor A or a connector B with the respective center tap of a toggle switch, thus enabling either the virtual channel controller VCC A or the virtual channel controller VCC B to communicate with a selected interlink-bus interface unit IBI.

Whenever the virtual channel controller VCC A wants to perform an interlink communication, i.e. to transmit information to another switching block, the virtual channel controller generates one of the load strobe signals "LD IBI n" for selecting an individual interlink bus for this transmission procedure. Each of these load strobes is individually channeled through the associated switching unit 705 as it is shown for the load strobe "LD IBI 2".

This signal is supplied to another First-In First-Out buffer memory 706 which is arranged between the switching unit 705 and the line drivers 704. The load strobe 702 represents the enabling signal for storing a data word which has to be transmitted from the virtual channel controller VCC A to the selected interlink-bus interface unit IBI n2. The intermediate storing of such information is necessary, since the switching block coupler comprising the interlink-bus system and the interlink-bus interface units is operated independent of the associated switching blocks. With reference to FIG. 5, it has been described how the bus output enable signal 517 is generated. This signal is transmitted across the transmission line from the interlink-bus interface unit IBI n2 to the selector interface SIF for controlling a read operation from the buffer memory 706 to the interlink-bus BUS via the interlink-bus interface unit IBI n2 during a bus cycle interval allocated to that interlink-bus interface unit.

Further control signals transmitted from or to the virtual channel controller VCC A are: the transfer request signal "IBI XFER REQ" 610, the enable signal "IBI to VCC ENABLE" 605 and the reset signal "IBI XFER RESET" 617. The signals initiate control operations for transmitting information from the interlink-bus interface unit to the virtual channel controller, as has been described with reference to FIG. 6 in more detail. Respective control lines are wired through the selector interface via the switching unit 705.

The devices described hereinbefore with reference to FIGS. 3 to 6 form the switching block coupler and, in addition, a switching unit between virtual channel controllers of a switching block and the switching block coupler. The various units of the switching block coupler and its principle operation has been described to establish a better understanding of interlink communication which is controlled by the virtual channel controllers of the switching blocks. This understanding of different operations should be an appropriate basis for the following detailed description of this relatively complex controlling unit.

Virtual Channel Controller

As to be seen from FIG. 2, the operative virtual channel controller VCC of a switching block is the main control unit for channeling information in both directions between three main units of the entire data exchange system. The virtual channel controller VCC receives data from the communication controller CC which is to be sent either to a central processor CP or to an interlink-bus interface unit IBI. The same applies to an interlink-bus interface unit and the central processor whenever these units act as data sources.

Figure 8:
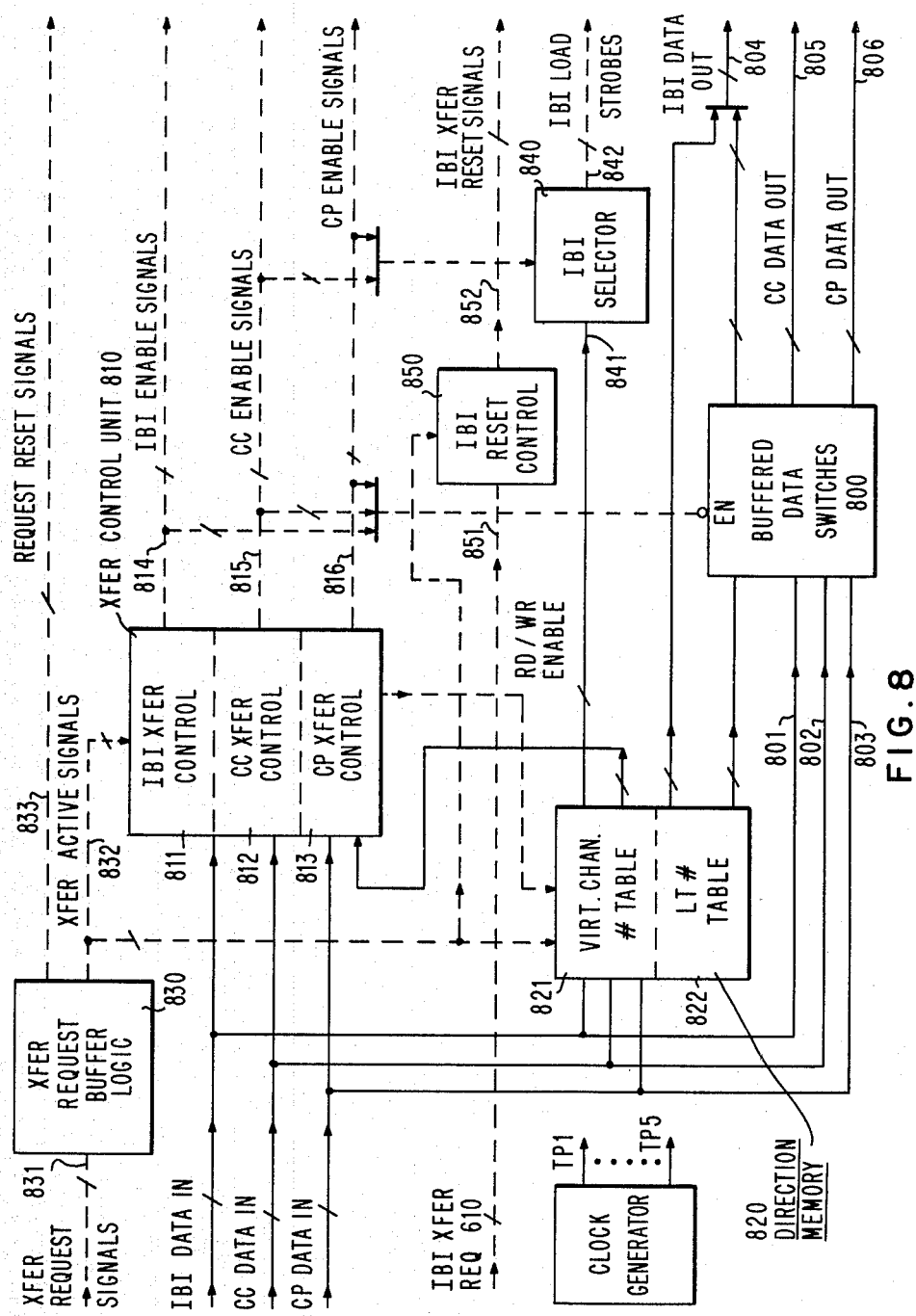
FIG. 8 represents a basic block diagram of a virtual channel controller which is the main control unit of a switching block for performing inter-system communication between two switching blocks across the interlink-bus system.

This principal control function of the virtual channel controller is displayed in FIG. 8 showing schematically a block diagram of this control unit. For the reasons pointed out above, the virtual channel controller mainly is a data switching unit comprising buffered data switches 800 for receiving incoming data from the different interlink-bus interface units IBI, the communications controller CC and the central processor CP. Respective parallel lines 801, 802 and 803 for transmitting the data are connected to the input side of the buffered data switches 800. Corresponding transmission lines 804, 805 and 806 for outgoing data to the various interlink-bus interface units IBI, the communications controller CC and the central processor CP are connected to the output side of these buffered data switches.

Data transfer is controlled by a transfer control unit 810. This unit evaluates the incoming type of data and generates different groups of control signals for controlling the operation of the buffered data switches 800. A sub-unit, the IBI transfer controller 811 generates control signals 814 for enabling a data transfer between a requesting interlink-bus interface unit IBI to the communications controller CC or to the central processor CP. A second sub-unit, the communications transfer controller 812 produces a similar control signal 815 for performing a data transfer between the communications controller CC and an interlink-bus interface unit IBI or the central processor CP. For routing incoming data from the central processor CP to the communications controller CC or an interlink-bus interface unit IBI a third sub-unit of the transfer control unit 810, the CP transfer controller 813, evaluates the specific type of data transfer and generates control signals 816 for enabling the buffered data switches 800 to switch this data to an interlink-bus interface unit IBI or the communications controller CC, as necessary.

For supporting the operation of the transfer control unit 810 there is arranged a direction memory 820 in the virtual channel controller VCC. It stores control information for routing individually specific incoming data from one data source to a selected data sink. The direction memory is composed of two parts containing a virtual channel number table 821 and a line terminator number table 822. Basically these memory tables are used to establish a through-connection from a local line terminator LT to a remote line terminator of a different switching block across virtual channels by means of dynamically set-up address control information. Based upon the type of incoming data and utilizing this routing information in the direction memory 820 the transfer control unit 810 generates the different groups of control signals 814, 815 and 816, respectively. The routing information itself is generated by the central processor CP of the switching block similar to local routing information of a conventional data exchange system. The central processor therefore is by assistance of the transfer control unit 810 enabled to transmit data to the direction memory 820 for performing a write operation, whereas any data transfer from another type of data source just can result in a read operation from the direction memory 820.

Since the virtual channel controller receives requests for data transfers from different sources asynchronously and independently, such transfer requests have to be noticed, accepted and queued. This is achieved by a transfer request buffer logic 830 which receives the different types of transfer request signals 831 at its input side and which generates control signals, so-called transfer active signals 832 for starting a selected one of the requested transfers. Also a second group of control signals, so-called request reset signals 833, is generated whenever a specific request is acknowledged and performed.

The virtual channel controller VCC receives data from and transmits data to just the one operative communiations controller CC and the one operative central processor CP, however, there is associated a group of interlink-bus interface units IBI and each unit may communicate with the virtual channel controller. For these reasons, the virtual channel controller VCC is provided with further sub-units, an interlink-bus interface selector 840 and an interlink-bus interface reset controller 850.

The interlink-bus interface selector 840 is controlled by two groups of the control signals generated by the transfer control unit 810 which enable a data transfer either from the communications controller CC or from the central processor CP to an interlink-bus interface unit. The appropriate interlink-bus interface unit IBI is selected dependent upon information received from the virtual channel number table 821 of the direction memory 820 across input lines 841 connected to the input side of the interlink-bus interface selector 840. The interlink-bus interface selector 840 generates the described load strobe signals for selecting an interlink-bus interface unit. The load strobe signals are carried across parallel output lines 842 of the interlink-bus interface selector.

The interlink-bus interface reset controller 850 is involved with data traffic coming in from an interlink-bus interface unit and responds to the selected interlink-bus interface unit when a transfer operation is acknowledged and performed. It is controlled by one of the transfer active signals 832, receives and evaluates transfer request signals of the individual interlink-bus interface unit at inputs 851, and generates at its output 852 individual reset signals for the interlink-bus interface units.

In the foregoing general description of the virtual channel controller VCC it is presented how different sub-units of the virtual channel controller cooperate. In the following, detailed description of the different sub-units will be given.

VCC Transfer Request Buffer Logic

Figure 9:
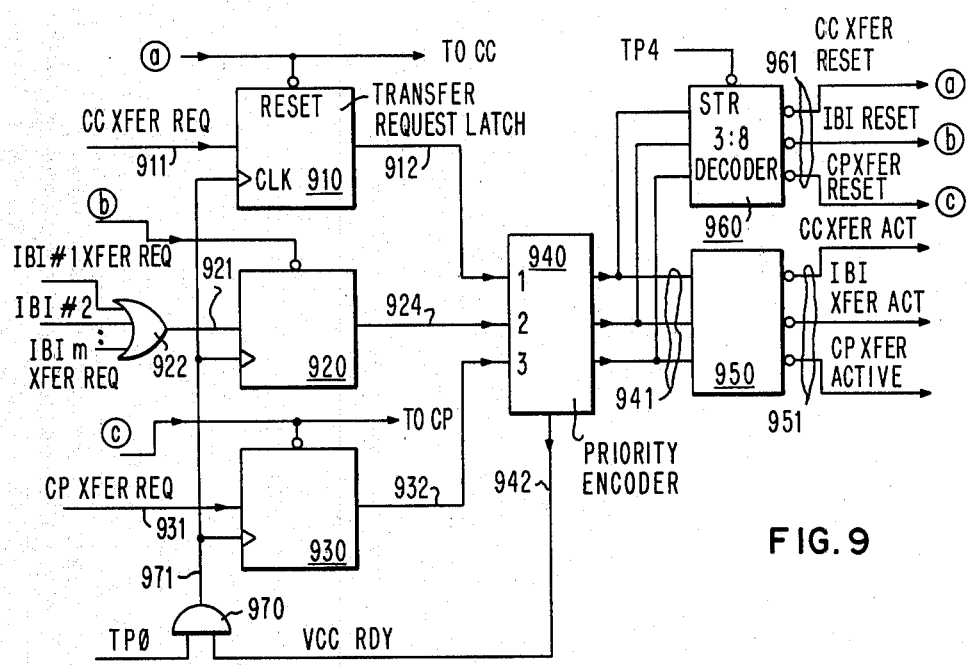
FIG. 9 shows a block diagram of a transfer request buffer logic, a sub-unit of the virtual channel controller shown in FIG. 8.

FIG. 9 shows a block diagram of the transfer request buffer logic 830. It has been mentioned that this unit receives transfer request signals from different data sources. In accordance with the three different groups of data sources which can request such a transfer the transfer request buffer logic is provided with three different transfer request latches 910, 920 and 930. Each of these latches receives a different one of the transfer request signals. The first transfer request latch 910 receives transfer requests from the communications controller CC along an input line 911 for storing such a request until the virtual channel controller VCC is ready to process the request. The second transfer latch 920 receives and stores transfer requests of the various interlink-bus interface units across an input line 921 which is connected to an output of a further OR-gate 922. Inputs of this OR-gate are connected in parallel with the control lines carrying transfer request signals "IBI XFER REQ" sent by respective interlink-bus interface units. By means of the OR-gate 922 the second transfer request latch 920 will be set whenever an interlink-bus interface unit requests a data transfer to the virtual channel controller VCC. The third transfer request latch 930 receives transfer requests from the central processor CP at input line 931.

According to the current state of the three latches pending transfer requests are offered to a priority decoder 940 across output lines 912, 924 or 932, each connected to one output of the three transfer request latches. The priority decoder 940 is a commercially available device, e.g. utilizing components SN 74148. The purpose of this priority decoder is to establish a certain order of responses to different types of transfer requests according to the general design of a switching block. According to the chosen scheme of the switching block, the communications controller CC mainly maintains the local traffic flow from and to subscribers associated with the switching block. In order to prevent possible loss of characters, a handshaking procedure is set up for communication between the central processor CP and the communications controller CC and vice versa. Therefore, a higher priority is chosen for requests of the communications controller CC than for those of the central processor CP. Medium priority is chosen for requests of the interlink-bus interface units IBI, thus taking into account that the data transfer rate across the interlink bus is higher than the data transfer rate between the virtual channel controller VCC and an interlink-bus interface unit IBI. The chosen order of priority gives transfer requests of the communications controller CC highest priority and transfer requests of the central processor CP lowest priority. It may be noted that any order of priority can be chosen and the implementation described above reflects just one approach. Obviously, system requirements can be different and any other order of priority may also be appropriate.

Three parallel output lines 941 of the priority encoder 940 commonly carry an output code designating the requesting device. This output code is supplied in parallel to two further decoder units 950 and 960. Both devices are composed of conventional 3-to-8 decoders. Both decoder units decode the output code of the priority decoder in the same manner, but at different times. Let it be noted here that for the reasons of avoiding unduely broadened description timely relationships of operations have been kept in the background insofar that time control signals generated by a master clock generator and/or dependent synchronizing units have not been shown and described, since it is obvious to those skilled in the art that such synchronizing measures have to be taken also in conventional exchange systems and since implementations of such measures are very well known. It is not intended to deviate now from these principles, but it is helpful to assume that operations of the virtual channel controller VCC are performed synchronized by a predetermined cycle composed of several consecutive time periods, for example, of six such time periods $t\phi$ through t5. Timely relationships which do not become self-explanatory by the sequence of the description will be depicted in conjunction with timing pulses TP$\phi$ through TP5, each referring to a respective one of the time periods $t\phi$ through t5 during a cycle of the virtual channel controller.

Coming back to the decoding of the priority encoder 940 by the decoder units 950 and 960, the output signals ocurring at the output 951 of the decoder unit 950 represent active signals, e.g. a signal "CC XFER ACT" indicating that a communications controller request has been accepted and is to be processed. The signals occurring at the output side 961 of the second decoder unit 960, represent reset signals referring to a requested data transfer which has already been performed by the virtual channel controller VCC. These signals are generated under the control of the timing pulse TP4 supplied to a strobe input of decoder unit 960. The timing scheme is such that an active signal occurs prior to the corresponding reset signal but still within the same cycle of a virtual channel controller VCC. Each of the outputs 961 of the second decoder unit 960 is fed back to a reset input of a respective one of the transfer request latches 910, 920 or 930 as pointed out by small letters a, b and c.

Thereby the corresponding transfer request latch is reset and is then prepared to accept a new transfer request signal. A new transfer request signal will become effective when the transfer request latches are triggered again by a clock pulse supplied in parallel across an output line of a further AND-gate 970. The inputs of this AND-gate 970 receive the timing pulse TP$\phi$—the first pulse of a cycle—and a ready signal 942 from the priority decoder 940 designating a ready condition of the priority encoder for receiving a new request. This reset scheme of the transfer request latches triggered by a timely defined control signal of the priority encoder 940 enables the transfer request buffer logic to follow up on incoming transfer requests in a chosen priority order without losing any transfer request of a calling device. The output signal of the transfer request buffer logic occurring at the outputs 951 of the decoder unit 950 represent the control input signal 832 fed to the transfer control unit 810 (FIG. 8). The reset signals occurring at the outputs 961 of the decoder unit 960 represent the request reset signal 833 (FIG. 8).

IBI Reset Control Unit of the VCC

Figure 10:
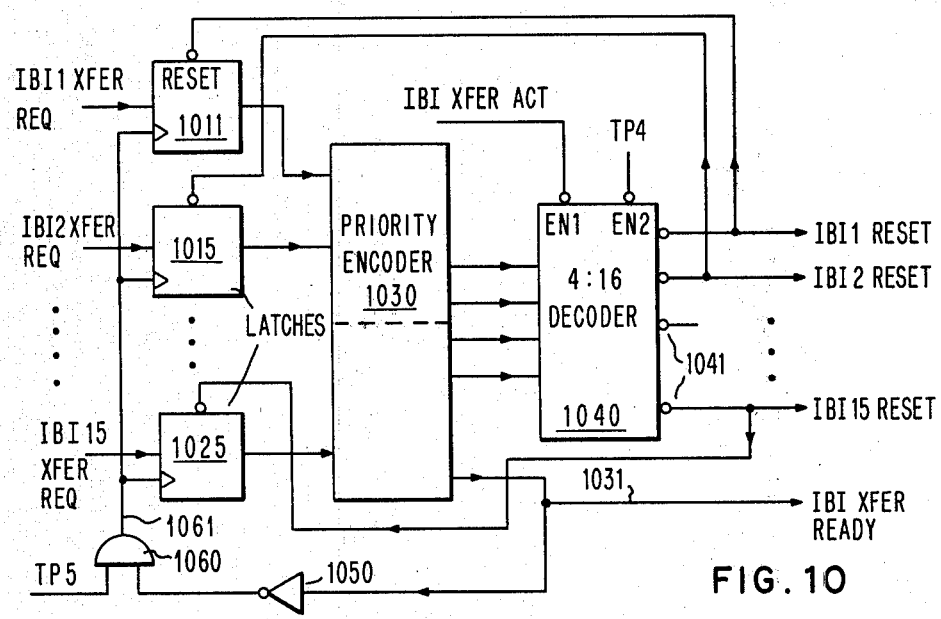
FIG. 10 represents the block diagram of another sub-unit of the virtual channel controller, the so-called IBI reset control unit which controls the queue of transfer requests of associated interlink-bus interface units.

It has been pointed out that data transfer requests of interlink-bus interface units IBI have to be handled individually, since several interlink-bus interface units can request a data transfer. For this reason, there is provided the IBI reset control unit 850 (FIG. 8). The block diagram shown in FIG. 10 represents the detailed composition of this control unit. Similarly to the transfer request buffer logic, it is composed of a plurality of further latches 1011, to 1025 each of them having an input for receiving the request signal "IBI XFER REQ" of a respective interlink-bus interface unit (corresponding to a system configuration of 15 interface units). Each of these latches has an output which is connected with an input of a further priority encoder 1030 operating similarly to the priority encoder 940 of the transfer request buffer logic (FIG. 9). The outputs of the priority encoder 1030 are connected in parallel with data inputs of a 4-to-16 decoder 1040. The decoder 1040 is controlled by two enable signals, the signal "IBI XFER ACT" generated by the transfer request buffer logic, as described above and the fourth timing pulse TP4 within a cycle of the virtual channel controller.

There could be established any order of priority within the group of 15 interlink-bus interface units associated with a switching block. In this embodiment, it is assumed that the normal numbering scheme also designates the priority order. A busy condition of the circuit arrangement described generates exactly one output signal during the fourth timing pulse TP4 of a virtual channel controller cycle whenever a data transfer from an interlink-bus interface unit IBI to the virtual channel controller VCC is performed. This output signal designates the transmitting interlink-bus interface unit and is used for resetting the respective transfer request. Each of these reset signals also is fed back to a reset input of the respective latch 1010 to 1025, thus enabling the input network of the priority encoder 1030 to respond to still pending transfer requests of lower priority.

Similar to the priority encoder 940 of the transfer request buffer logic (FIG. 9) also the priority encoder 1030 of the IBI reset control unit is provided with an additional output 1031 for a ready signal designated as IBIn Transfer Ready (IBI XFER READY). This output line carries a signal monitoring the operative condition of the priority encoder 1030. This output line 1031 is connected via an inverter 1050 to one input of a further AND-gate 1060, which second input receives the fifth timing pulse TP5 designating the last phase of the cycle of the virtual channel controller VCC.

The output of the AND-gate is connected in parallel to the clock inputs of each of the latches 1010 to 1025. This feedback network just enables intermediate storing of a set of current data transfer requests of the individual interlink-bus interface units only if the priority encoder 1030 is not longer occupied; whereas the individual resetting of the signal latches by a reset signal enables the priority encoder 1030 to respond to all data transfer requests which are presented at a specific moment without suppressing any request of lower order of priority.

Transfer Control Unit of the VCC

In the description of the basic structure of the virtual channel controller with reference to FIG. 8, it has been pointed out that the transfer control unit 810 performs the main control operations of the virtual channel controller VCC. The following description of FIGS. 11 through 13 refers to details of sub-units of the transfer control unit 810. It may be noted that these three sub-units of the transfer control unit, since they serve similar purposes, are, at least to some extent, of the same design, therefore, it does not seem necessary to describe all sub-units in full detail.

Figure 11:
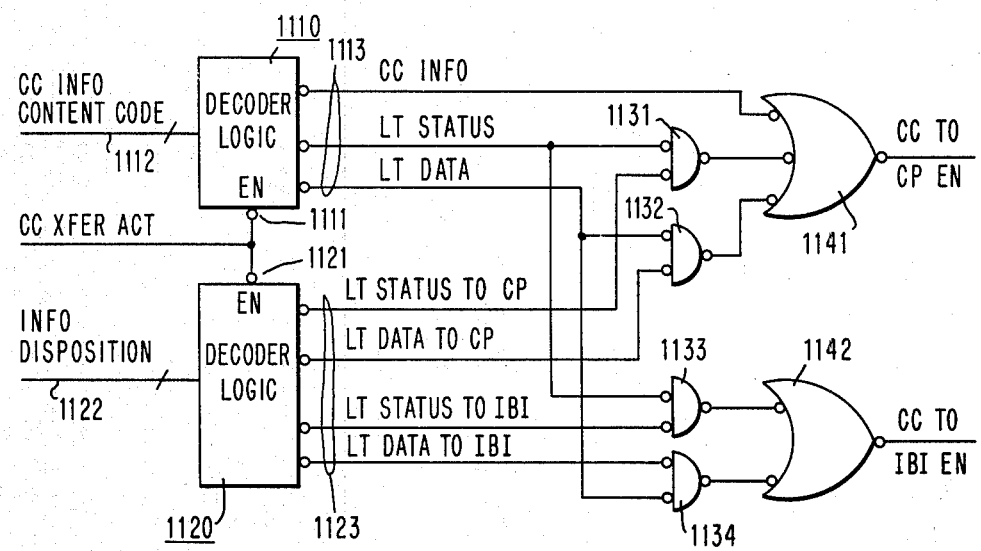
FIGS. 11 through 14 represent schematically the logical design several sub-units of the transfer control unit of the virtual channel controller.

FIG. 11 shows one of these sub-units, the CC transfer control unit which comprises two decoder logic units 1110 and 1120. These logic units have enabling inputs 1111 and 1121, respectively, which receive the transfer active signal "CC XFER ACT" generated by the transfer request buffer logic 830 (in FIG. 9). The CC transfer control unit is operative only if the transfer request buffer logic designates a data transfer from the communications controller CC. Both decoder logic units 1110 and 1120 have parallel data inputs 1112 and 1122. Decoder logic unit 1110 is supplied with a part of a data word transferred from the communications controller CC. This part of a data word is designated as "CC INFO CONTENT CODE" and specifies the type of data which is being sent to the virtual channel controller VCC. Three types of data have to be distinguished. A data character may refer to control information which is to be sent to the central processor CP. The data character also may represent status information of a line terminator LT. Such status information may be control information related to either intra-switching block communication or interlink communication across the bus system. A data word including data information from line terminators LT may also have to be supplied either to the central processor CP or to a selected one of the interlink-bus interface units IBI. Accordingly, the decoder logic unit 1110 is provided with three parallel outputs 1113 designating the three different types of information sent out by the communications controller CC.

Similarly the decoder logic unit 1120 has parallel data inputs 1122 receiving input information which is designated as "INFO DISPOSITION". As will be described later in full detail, this information is part of an entry of the line terminator table or of the virtual channel number table of the direction memory 820 (FIG. 8). This control information is used for controlling the routing of the currently processed transfer request. According to the status of a call associated with this entry, the information contained in the information disposition field is updated automatically by the respective central processor CP of the switching block. The contents of the disposition field define the transferred data word either as line terminator status information directed to an interlink-bus interface unit IBI or to the central processor CP or as line terminator data which also could be sent either to the central processor CP or an interlink-bus unit IBI. Corresponding to these four possibilities of transmitting two different types of data to two different types of data sinks the decoder logic unit 1120 has four parallel control signal outputs 1123. It may be mentioned that these outputs are not exclusive, i.e. information may have to be sent in parallel to the central processor CP and an interlink-bus interface unit IBI.

Figure 12:
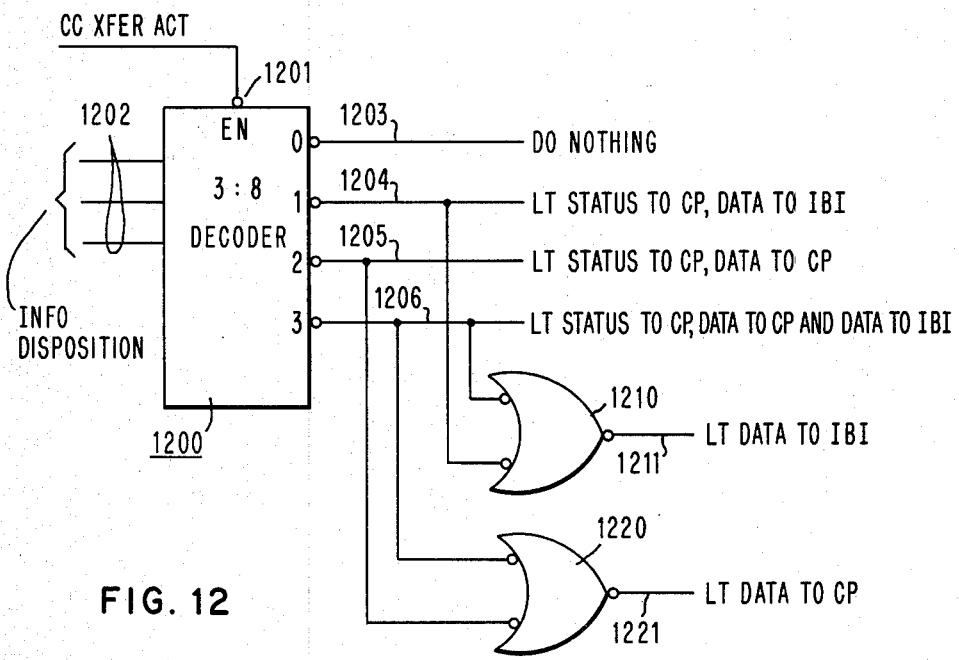

A detail of the decoder logic 1120 is shown in FIG. 12 It illustrates that the decoder logic unit 1120 comprises a further 3-to-8 decoder 1200 having an enabling input 1201, three data inputs 1202 and four outputs 1203 to 1206. The remaining four outputs of the conventional element are not used in this application. The control signal "CC XFER ACT" supplied to the enabling input 1201 enables information received at data inputs 1202 in parallel to be decoded by the decoder. Information occurring at these data inputs 1202 represents the contents of the information disposition field of the presently addressed entry of the direction memory tables. The current code is decoded by the decoder element 1200 for generating respective output signals at decoder outputs 1203 to 1206.

A signal at the first decoder output 1203 simply means "do nothing". The output signal at the second decoder output 1204 specifies the presently transferred data word to be line terminator status information which has to be sent to the central processor or to be line terminator data to be sent to an interlink-bus interface unit. A control signal occurring at the third decoder output 1205 designates either line terminator status information or data both to be sent to the central processor. Finally, the fourth output 1206 determines line terminator status information to be sent to the central processor CP or data to be sent either to the central processor or to an interlink-bus interface unit.

Each of the second and the fourth decoder outputs is connected with a respective input of a first NOR-gate 1210. An output 1211 of the NOR-gate generates a control signal representing a data transfer of line terminator data which has to be sent to one of the interlink-bus interface units. A second NOR-gate 1220 is connected by its inputs to the third and the fourth output of decoder element 1200 thus generating an output signal which specifies a data transfer of line terminator data to the central processor CP.

As may be kept from a comparison to FIG. 11 the two control signals "LT DATA TO IBI" and "LT DATA TO CP" are output signals of the decoder logic units 1120. Thus, the entire decoder logic unit 1120 obviously can be assembled from 3-to-8 decoder elements and groups of NOR-gates.

Accordingly, the decoder logic unit 1110, shown in FIG. 11, is of similar design for generating corresponding control signals at outputs 1113. The control signals derived from the content code of communications controller information designate the type of information concerned. The control signals derived from the information disposition field characterize the routing of a transferred data word to a data source, i.e. the central processor CP or an interlink-bus interface unit IBI.

A logic network composed of further AND-gates 1131 to 1134 and two further OR-gates 1141, 1142 is arranged at the output side of both decoder logic units 1110 and 1120. Each of these AND-gates 1131 to 1134 logically links one of the control signals occurring at an output of the first decoder logic unit 1110 to a corresponding control signal at one of the outputs of the second decoder logic unit 1120. Each of the inputs of OR-gate 1141 is connected to a respective output of AND-gates 1131 and 1132 and one control signal output of the decoder logic unit 1110 directly. Each of the input signals of the OR-gate 1141 defines a condition for a data transfer from the communications controller CC to the central processor CP. The control signal occurring at the output of the OR-gate 1141 designated by "CC TO CP EN" represents these conditions.

Correspondingly, the second half of the logical network composed of AND-gates 1133 and 1134 and the second OR-gate 1142 derives from the output signals of the decoder logic units 1110 and 1120 the condition that data have to be transmitted to a selected interlink-bus interface unit IBI. The corresponding control signal generated at the output of the OR-gate 1142 is designated as "CC TO IBI EN".

In the foregoing it has been described with reference to FIGS. 11 and 12 how enable signals for a data transfer between the communications controller CC, on the one hand, and the central processor CP or an interlink-bus interface unit IBI, on the other hand, are generated. Similarly, in case of a data transfer request of an interlink-bus interface unit, the routing control information for one data word to be transmitted is derived from information contained in the data word and the contents of an entry in the direction memory associated with the call concerned.

The IBI transfer control unit 811 (FIG. 8) correspondingly is of similar design, therefore, such design is not shown in the drawings and further detailed description is deemed not to be necessary.

Figure 13:
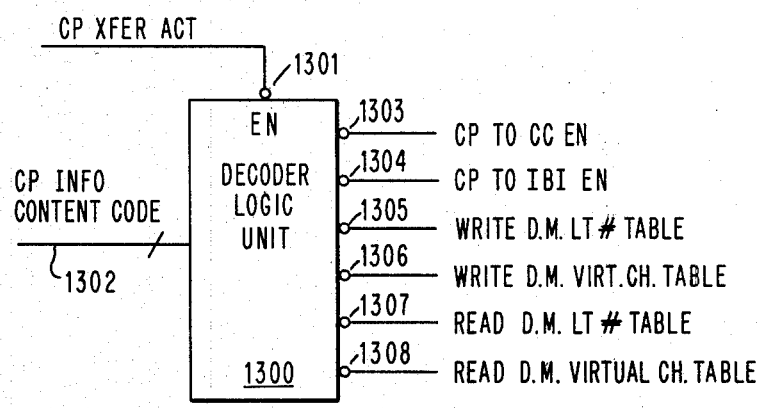

Because of the specific control function of the processor CP the design of the CP transfer control unit 813 (FIG. 8) is somewhat different to that of the transfer control subunits described. The content code of the information which is transmitted from the central processor CP to the communications controller CC or an interlink-bus interface unit IBI determines the transfer operation to be performed. This is evident from FIG. 13 showing the design of the CP transfer control unit 813 schematically. The control unit again comprises a decoder logic unit 1300 which may be composed of conventional decoder elements and a logic network which is similar to that of the CC transfer control unit. The decoder logic unit 1300 has an enable input 1301 which is supplied by the control signal "CP XFER ACT" generated by the transfer request buffer logic 813 (FIG. 8). The signal turns the decoder logic unit 1300 into an operative condition whenever a data transfer from the central processor CP is accepted. Parallel data inputs 1302 of the decoder logic unit 1300 receive the content code of the transmitted data word. The control of routing of the information to be transmitted is performed dependent on this code. The content code specifies routing either to the communications controller CC or to an interlink-bus interface unit IBI, as is evident from control signals generated at outputs 1303 and 1304 of the decoder logic unit 1300.

A data transfer request of the central processor CP can be different from other requests in so far that the central processor CP controls operations of the direction memory 820 (FIG. 8). Read operations from the direction memory may be initiated in connection with data transfers from an interlink-bus interface unit IBI or from the communications controller CC. However, the central processor CP is the only control unit performing write operations into the tables of the direction memory for updating control and routing information. The further outputs 1305 to 1308 of decoder logic unit 1300 carry control signals referring to such write or read operations to or from the direction memory. It may be understood that control outputs 1303 and 1304, on the one hand, and control outputs 1305 through 1308, on the other hand, are non-exclusive.

IBI Selector Unit of the VCC

Figure 14:
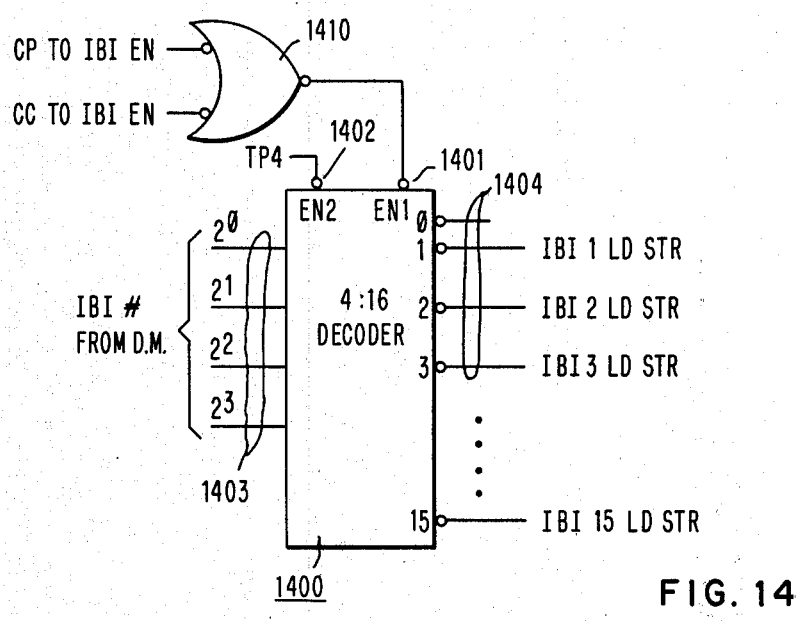

The six different enable signals generated by the transfer control unit 810 (FIG. 8) control the operation of the buffered data switches 800 (FIG. 8) and the IBI selector unit 840 (FIG. 8). In the following there is described the composition and operation of the IBI selector unit 840 with reference to FIG. 14.

The IBI selector unit is composed of a commercially available 4-to-16 decoder element 1400, having two enabling inputs 1401 and 1402. A further OR-gate 1410 receiving at its inputs the enabling signals "CP TO IBI ENABLE" and "CC TO IBI ENABLE" is connected by its output to the first enabling input 1401 of the 4-to-16 decoder element 1400. The second enabling input 1402 of decoder element 1400 is utilized for timing of the operations and is supplied with the fourth timing pulse TP4. In case of an activated data transfer to an interlink-bus interface unit IBI the data inputs 1403 of the decoder element 1400 are activated during the "ON" condition of this timing pulse TP4. Signals received at inputs 1403 are then decoded by the decoder element 1400 for generating exclusive control signals at outputs 1404 of the decoder element 1400. At the data inputs 1403 routing information from the direction memory is received for determining the one selected interlink-bus interface unit. The exclusively activated outputs 1404 each carry a load strobe, e.g. LD IBI 1 STR for selecting the first interlink-bus interface unit IBI 1 of the associated group of such units. The strobe is sent along a separate strobe line to the associated interlink-bus interface unit for controlling a write operation into the input data buffer 706 (FIG. 7), as described.

Direction Memory

Figure 15:
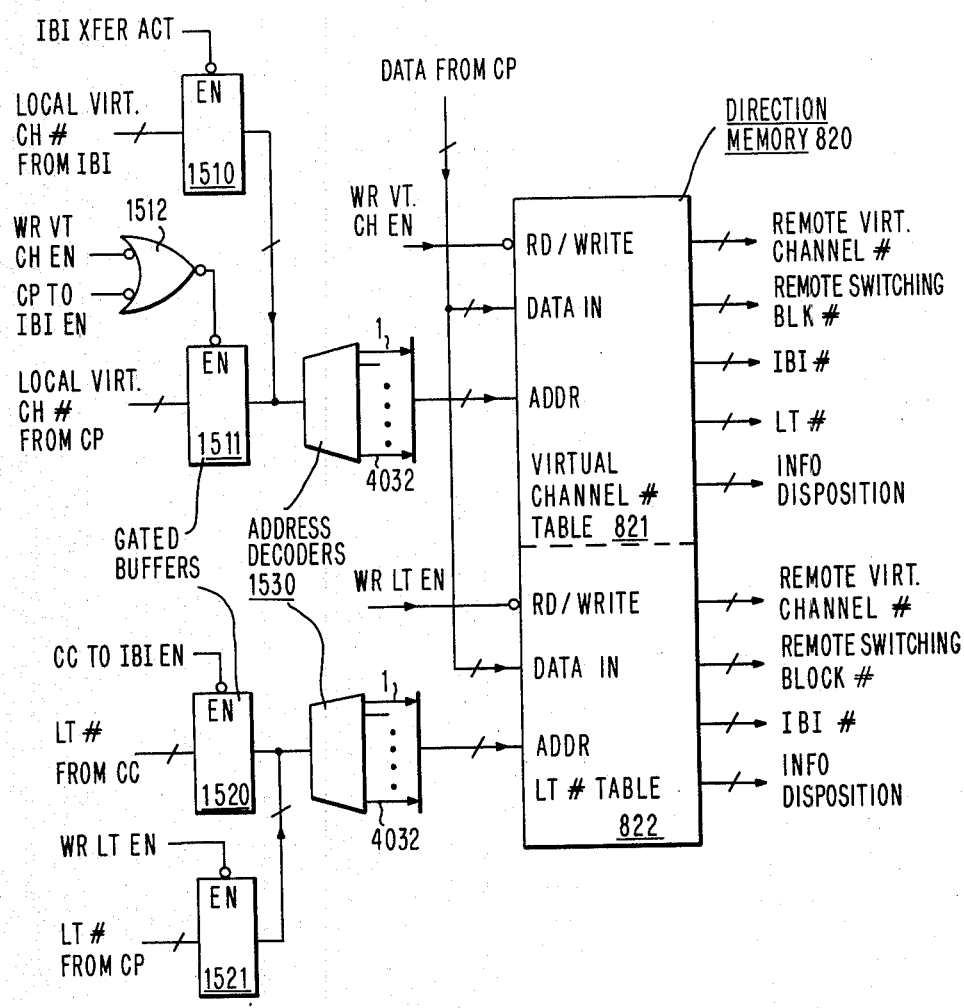
FIG. 15 represents a block diagram of a direction memory of the virtual channel controller and related control units for controlling read/write operations from and to the direction memory.

In the foregoing several times reference has been made to information received from the direction memory 820 (FIG. 8). The direction memory will now be described in more detail with reference to FIGS. 15 through 17. FIG. 15 shows the composition of this memory including address decoder units. The direction memory is composed of two parts, the virtual channel number (VC#) table 821 and the line terminator (LT#) number table 822. The format of the entries of these tables are shown in more detail in FIGS. 16 and 17, respectively.

In the conventional data exchange system, as has been described in the "Background of the Invention", the communications controller CC comprises a connection memory for storing a line terminator address as well as line specific control and status information. Similarly the tables of the direction memory are used, to direct characters from a data source to a data sink when utilizing the interlink bus. Thus, the virtual channel number table 821 comprises 4,032 entries for call blocks of calls which need interlink communication. The format of such an entry of the virtual channel number table 821 is represented in FIG. 16. A twelve-bit-field 1610 contains the virtual channel number VC#. The following three-bit-field 1611, the so-called information disposition field, contains control information for routing a data word to be transmitted—or part of it—to an appropriate data sink. The following six-bit-field 1612 holds the remote switching block number SB#. Another field 1613 of 12 bit length is reserved for the line terminator number LT#. Still another four-bit-field 1614 holds a bus BUS# for selecting one of the interlink buses and interlink-bus interface units, correspondingly, to be reserved for this call. Finally, a two-bit-field 1615 contains parity bits for testing the correct contents of the entry. The whole entry has a length of 38 bits.

Each of the 4,032 entries of the line terminator number table 822 is associated with one of the local line terminators of the switching block. This pre-allocation corresponds to a reduced data format of entries of the line terminator number table as represented in FIG. 17. A first three-bit-field 1710 is the information disposition field. The second field 1711 of 12 bit length holds a virtual channel number VC#, the following six-bit-field 1712 is reserved for the remote switching block number SB#. Another four-bit-field 1713 contains the number of the interlink-bus BUS# reserved for this call and the last field 1714 of only one bit holds the parity bit. The total length of each entry is 26 bits.

Referring now again to FIG. 15, it may be seen that parallel outputs of the direction memory are designated by corresponding parts of the respective entries. The direction memory is addressed by address decoder units establishing either an address for selecting an entry of the virtual channel number table 821 or an entry of the line terminator number table 822. Each of these address decoder units comprises two respective groups of gated data buffers 1510, 1511 and 1520, 1521. The data buffers are represented by just one buffer element. The data buffers 1510 are connected by their inputs in parallel to incoming data lines coupled to interlink bus-interface units via the selector interface unit SIF (FIG. 7). These data lines carry the local virtual channel number which is part of a data word transmitted from a requesting interlink-bus interface unit. Data buffers 1510 have enable inputs which are supplied by the control signal "IBI XFER ACT" and are thus in an operable condition as soon as the virtual channel controller VCC accepts to perform a data transfer operation requested by interlink-bus interface unit IBI.

The inputs of the second group of gated data buffers 1511 are connected in parallel to incoming data lines connected to the central processor CP; the selected group of data lines also carries the local virtual channel number.

Data buffers 1511 have enable inputs which are connected in parallel to a further OR-gate 1512 having two inputs which are supplied with control signals generated during processing a data transmission request of the central processor CP. Both control signals are generated by the CP transfer control unit 1300 (FIG. 13). The signal occurring at output 1306 of decoder logic unit 1300 specifies—as described—a write operation into the direction memory.

The other control signal is established whenever a central processor CP specifies data to be sent to an interlink-bus interface unit IBI, this control signal occurs at the output 1304 of the decoder logic unit 1300. Both signals will drive the gated data buffers 1511 operable independently.

The second group of gated data buffers 1520 and 1521 is used to buffer address information for selecting an entry of the line terminator number table 822. An entry of the line terminator number table 822 may be selected while a data word from the communications controller CC to an interlink-bus interface unit IBI is transmitted or a write operation into an entry under control of the central processor CP is performed. The enable inputs of gated data buffers 1520 are supplied with the control signal "CC TO IBI ENABLE" generated by the CC transfer control unit 812 (FIG. 8). During the presence of the enable signal the gated data buffers 1520 obtain address information at their parallel data inputs. This address information is part of a data word transmitted from the communications controller CC.

Correspondingly, the gated data buffers 1521 receive at their parallel data inputs respective address information transmitted from the central processor CP and are enabled by the control signal "WR LT ENABLE". This control signal is one of the enable signals which are generated by the CP transfer control unit 813 (FIGS. 8 and 13). With each table of the direction memory there is associated a conventional address decoder 1530, as schematically shown in FIG. 15. In the represented configuration there are arranged two of such address decoder units 1530 each associated with one of both tables of the direction memory. Each input of the address decoder units is commonly connected to a respective output of one group of data buffers 1510, 1511 and 1520, 1521, respectively. The parallel outputs of each address decoder unit are coupled with respective address inputs ADDR of the direction memory. The design allows independent addressing of both memory tables. If the timing for read/write operations of the direction memory can be arranged such that no overlap of operations with respect to the different tables occurs, also one single address decoder could be used. A common address decoder unit would have to cover the selecting of 2×4,032 entries of the entire memory, so that the total amount of decoder components had to be the same. The only difference is that one additional address bit had to be derived from the state of the control signals which are generated by the CP transfer control unit 812 for performing read/write operations from or into the virtual channel number table and the line terminator number table. Such control signals according to the presented design are separately fed to corresponding enabling inputs designated as RD/WRITE inputs.

Data Switches of the VCC

Having described all the different control devices and selector units of the virtual channel controller hereinbefore, it should now be relatively easy to understand how the switching operation of a data word coming in from one data source, the communications controller, an interlink-bus interface unit or the central processor and going out to a data source—which can be any one of the mentioned devices—is performed.

Figure 18:
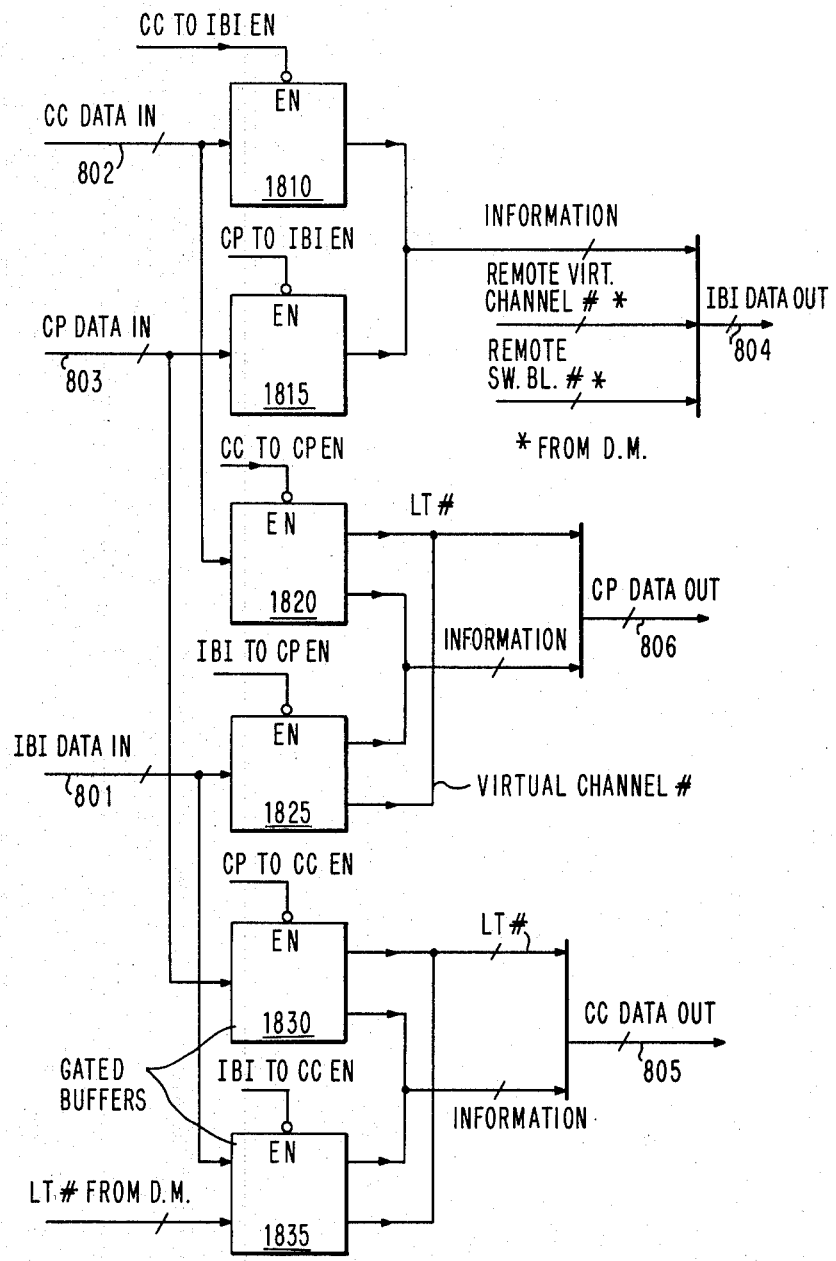
FIG. 18 represents a block diagram of buffered data switches of the virtual channel controller for switching information from a central processor system, a communications controller or an interlink-bus interface unit of the switching block to another one of these units.

This switching operation is handled by buffered data switches 800 (FIG. 8) the design of the switching device is schematically shown in FIG. 18 in more detail. The device is composed of six groups of gated data buffers 1810, 1815, . . . , 1835. In the diagram, again, each group of data buffers is just represented by one element. Obviously, there have to be as much individual buffer elements in each group as there are parallel incoming data lines. Since the buffer elements are of conventional design and are arranged just in parallel with respect to incoming and outgoing data lines, further detailed description is believed not to be necessary.

The arrangement of six groups of gated data buffers corresponds to the scheme of switching data coming in from one of three different devices and to be transferred to either one of two devices. This transmission scheme results in six different ways of data traffic. Accordingly, data lines 802 carrying incoming data from the communications controller CC are connected in parallel to respective data inputs of the first and third group of gated data buffers 1810 and 1820. Data lines 803 carrying data which have been sent out by the central processor CP are connected to inputs of the second and the fifth group of gated data buffers 1815 and 1830. Finally data lines 801 carrying a data word which is transmitted from an interlink-bus interface unit are connected with respective inputs of the fourth and the sixth group of gated data buffers 1825 and 1835.

Similarly to the arrangement of input connections the outgoing data lines 804, 805 and 806 are connected with the outputs of two different groups of the gated data buffers. Data lines 804 carrying outgoing data to an interlink-bus interface unit IBI are arranged in parallel with respect to the first and second group of gated data buffers 1810 and 1815. Data lines 806 forming lines for outgoing data to the central processor CP are coupled to the third and the fourth group of gated data buffers 1820 and 1825; and data lines 805 for outgoing data to the communications controller CC are connected in parallel to outputs of the fifth and sixth group of gated data buffers 1830 and 1835.

According to the general scheme of data traffic each group of gated data buffers is enabled by a different one of the six enabling control signals generated by the transfer control unit 810 (FIG. 8). Since it has been described in detail how these control signals are generated, the illustration in FIG. 18 should be self-explanatory. During one cycle of the virtual channel controller VCC just one data request of an interlink-bus interface unit IBI, the communications controller CC or the central processor CP is activated. Having established the routing of the data word to be transmitted, one of these enabling signals is generated by the respective sub-unit of the transfer control unit 810. This enabling control signal is supplied to the respective group of gated data buffers for controlling the operative mode. Again, as it is evident from the illustration of FIG. 18, incoming data are not just channeled through a group of operative data buffers, but an outgoing data word may contain replaced or reassembled bit groups. Such bit groups may refer to status and routing control information such as a remote virtual channel number and a remote switching block number of a data word to be sent out to an interlink-bus interface unit IBI along data lines 804. In another example, a data word to be sent out to the communications controller CC also embraces a bit group designating a line terminator number. This line terminator number either can be generated directly by the central processor CP and can be switched through the fifth group of gated data buffers 830 or it can be read from an entry in the direction memory and is channeled through the sixth group of gated data buffers 1835.

Operation of the System-Intra-Switching Block Calls

The described data exchange system services two types of calls: calls between two local line terminators LT associated with one and the same switching block, so-called intra-switching block calls, and calls between two remote line terminators associated with different switching blocks, designated as inter-switching block calls. Calls of the first type are performed in the same manner as calls of the known basic exchange system described in the "Background of the Invention". A description of such calls is believed to be necessary only to the extent as to clearly distinguish respective calling procedures from those using the interlink-bus system.

An intra-switching block call is initiated, e.g. in a double current bipolar circuit by inverting of the state of a forward signalling path from start polarity (space) to stop polarity (mark). "Forward" here refers to the direction of a call set-up. The line terminator LT associated with the calling subscriber recognizes this change of polarity and reports it to the central processor CP via the communications controller CC. Since the previous state of the calling line was the free-line condition, the polarity reversal is interpreted as a call request. The central processor CP in performing a call control routine, in response, returns a call confirmation signal on the backward signalling path. Depending on the type of line and the signalling criteria associated with this line, this call confirmation signal may be either a steady or a temporary transition from start polarity to stop polarity. In a subroutine of the central processor CP an area of the main memory designated as call block is allocated to the calling line. This memory area is used for storing dynamic data necessary for controlling call set-up and clear-down, and if applicable all subsequent call record journalling. In accordance with CCITT recommendation, the call confirmation signal is sent within 150 milliseconds after receiving the call request.

If call record journalling is handled by the data exchange system, usually the calling party has to be identified first. This can be accomplished by requesting an answerback code which must arrive within a specified time after the request is made. The reception of the entire answerback code is monitored and a check of the code contents may be run if required.

After having allocated the call block, the central processor CP generates a proceed-to-select signal which is sent to the calling party. There are known different forms of such a signal, such as merely a stop polarity pulse or a "give answer" (ga) or a "date and time of day" message. The type of the signal may be fixedly associated with a trunk group or even subscribers.

Thereupon, the calling subscriber responds with selection information which is transferred to the associated line terminator LT and across the virtual channel controller VCC to the central processor CP. The central processor CP stores only the selection information itself in the call block, certain valid characters such as spaces being omitted. The end of the selection information is recognized on the reception of an end-of-selection signal, e.g. "+", on arrival of a given number of digits or as a result of a specified time amount following reception of the last selection digit.

The selection information stored in the allocated call block of the main memory is analyzed by subroutines performed by the central processor CP. Routing tables stored in the data base of the central processing unit are utilized in order to determine the outgoing line. Such tables could contain for some applications, a prime route and any alternate routes available for the destination. Conventionally the basis of alternate routing is that all accessible points of the network, including directly connected subscriber stations, are regarded as a destination. All these destinations are entered in a routing table. The routing information, first choice or alternate route, comprises a trunk group number to be used and code digits to be added, deleted or changed. This means that the actual number to be sent out may be different depending on the trunk group used to through-connect the call. The routing subroutine may include specific hunting methods used in the search for a free line in a trunk group. Also, during the selection analysis a check is made to determine whether a desired connection is permitted. Information used for such a barring check is class of traffic and trunk-group specific data.

When a central processor CP has completed the routing procedure the call is switched through to a line terminator LT which has been selected as a result of analysis and routing procedure. The central processor CP issues a command to the selected line terminator LT via the transparent virtual channel controller VCC and the communications controller CC to the selected line terminator LT to accept the call. The called party responds to the request by a reversal of the steady polarity on the line or by returning a pulse.

The signal is recognized by the line terminator LT associated with the called line and is reported to the central processor CP where it is interpreted as the call confirmation. If the call confirmation signal is not received within a predetermined period of time, a re-test procedure is initiated automatically. If the called subscriber station is ready, the exchange system receives a call-connect signal. This is recognized by the central processor CP which, in turn, sends a call-connect signal to the calling party and then initiates the through-connection.

This is accomplished by entering the address of the called line terminator LT into an entry of the connection memory which is located in the communications controller CC. This entry covering a word in the connection memory is pre-allocated to one specific line terminator LT. The same storage operation also applies to the respective entry associated with the called line terminator LT where the address of the calling line terminator is stored. After the call-connect signal has been sent, the current call block is replaced from the main memory MM of the central processing unit and buffered on the peripheral data base.

Having established the call-connect condition, the central processor CP is released, since data is transferred from line terminator to line terminator under control of the communications controller CC without further support of the central processor CP besides simply monitoring the operation to insure the call-connect condition does not exceed a specified maximum of time.

The central processor CP resumes control in the clear-down phase of a call. A call disconnect can be initiated by either subscriber, e.g. by pressing the clearing button of the signalling unit. This action causes clearing signals to be generated. Let it be assumed the clear request is sent by the calling subscriber and is recognized by the associated line terminator LT. This line terminator LT then transfers this information via the communications controller CC to the central processor CP. Thereupon, the central processor CP starts a clear-down procedure. During this procedure the central processor CP switches the line of the called line terminator LT to start polarity and checks the duration of the clear request on the calling party's line. A period exceeding 450 ms is interpreted as clearing signal. In the beginning of the clear-down, an empty location for a call block in the main memory is again assigned to the call and the buffered respective call block is transferred from the data base into the currently assigned memory area. Call record journalling may then proceed. In addition, in response to the clearing signal, a clear confirmation signal is sent to the calling subscriber. The clear confirmation signal, also, is expected from the called subscriber within a given time. If it is not received within the specified period, the line concerned is switched to an intercept condition. Without any further change within a minute period of time an out-of-order signal is given. A line that has been cleared can only be seized again after a guard delay of some seconds to allow any distant exchange to release completely and prepare for accepting a new call. However, an incoming call request will be honored if a minimum period of time which is less than the guard delay time has elapsed. As soon as the guard delay commences start polarity is placed on both the sending and the receiving leg of the line immediately.

Inter-Switching Block Calls

The described starting phase of a call also applies to the second type of calls which require interlink communication. The respective call set-up begins in the same manner as it does with an intra-switching block call up to the step of analyzing the selection information, i.e. the beginning of the dial code look up. Prior to this step the virtual channel controller VCC—also for the second type of calls—is transparent for both the communications controller CC and the central processor CP.

However, basically there are no pre-allocated communications links between different switching blocks. All links are set up dynamically on a protocol basis, thus the number of communications links active between any pair of switching blocks is determined by instantaneous traffic conditions. The traffic flow through the switching block coupler is controlled by stored information which is used for routing a requested call. This stored information is contained in a dial code table and destination routing tables arranged in the main memory of each switching block are accessible by the associated central processor CP. These tables are conventionally organized as tree tables such that dial codes specifying subscribers and trunks of another switching block lead step by step and linked together by pointers to a destination routing table for the remote switching block. This analysis performed by the central processor indicates that the call request is an inter-system call.

Figure 1:
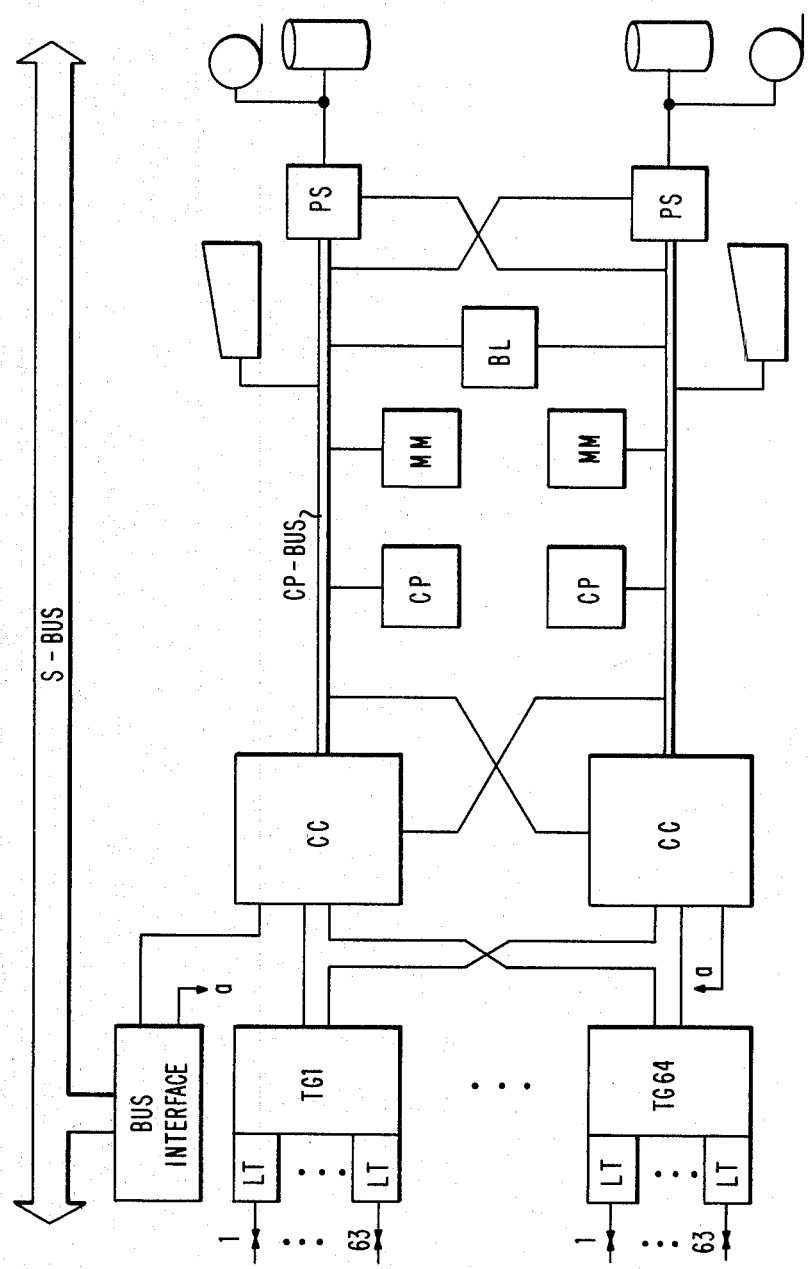
FIG. 1 shows a block diagram of a conventional electronic digital exchange system.
Figure 19:
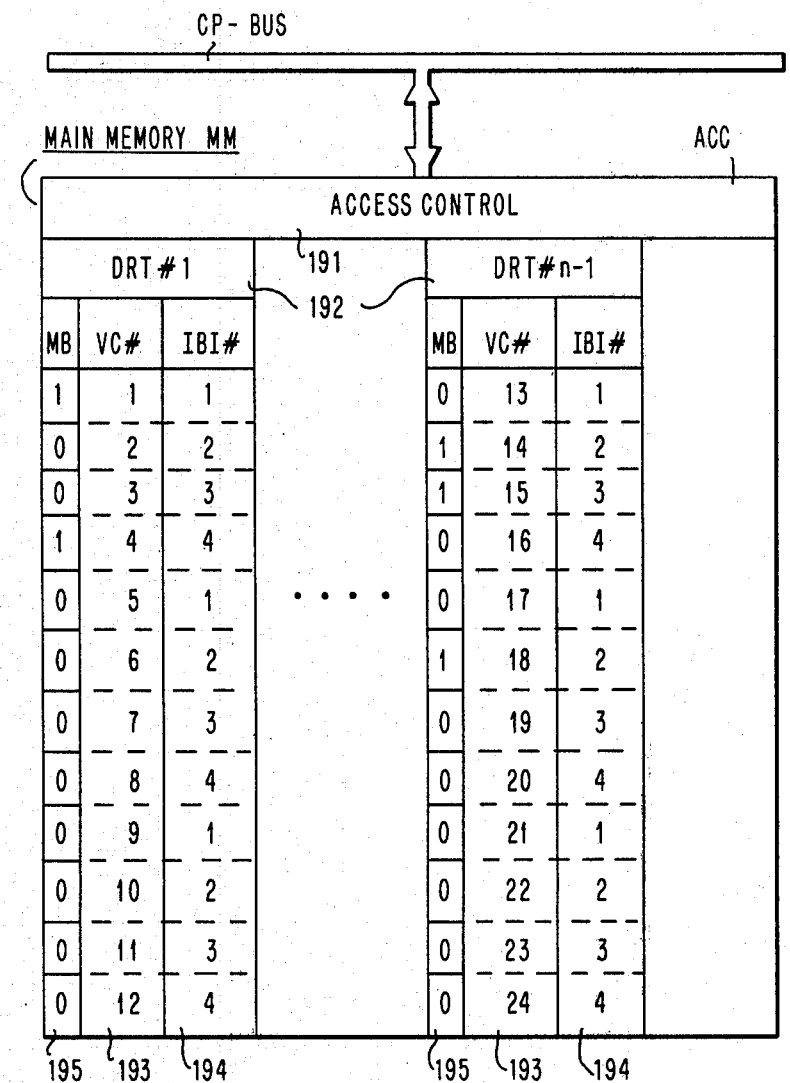
FIG. 19 shows a block diagram of a part of the main memory of the central processor system containing destination routing tables which are used for setting up through-connections from one switching block to another switching block of the system across the interlick-bus system.

One of the possibilities for organizing the destination routing tables is shown in FIG. 19 representing an excerpt of the main memory MM which has been described with reference to the basic structure of the exchange in conjunction with FIG. 1. In FIG. 19 there are schematically indicated the central processor bus CP-BUS and linked to this bus the main memory MM by means of an access control unit 191. The main memory MM contains—as has been mentioned—among others areas which are allocated to the different destination routing tables 192. There is provided at least one individual table for each remote switching block. More than one table may be appropriate, if optimal services require individual control. According to the assumed system configuration with n different switching blocks SB, in each main memory MM associated with the central processor of each switching block at least (n−1) destination routing tables have to be provided. A destination routing table 192 is selected by control information as a result of dial code analysis, as has been pointed out.

The destination routing tables—just two of these tables are represented in the drawing—are of identical design and are composed of a plurality of entries. The purpose of each entry is to allocate a specific virtual channel of the local switching block to a currently requested call and to determine the locally used interlink-bus BUS as specified by the number of an interlink-bus interface unit IBI#. A variety of different allocating schemes could be implemented. For the reasons of simplification, of transparent data traffic and of less traffic control, it is assumed that the available virtual channels of a switching block are grouped in two different ways: one type of grouping associates equal amounts of virtual channels to each of the remote switching blocks, based upon the simplifying assumption that each remote switching block shares equally in the traffic load of the local switching block as far as interlink communication is concerned. The same virtual channels are furthermore grouped into groups of virtual channels which are permanently assigned to a specific one of the interlink-buses BUS. This grouping scheme reflects the second assumption that each interlink bus BUS of the exchange system bears an equal share of the interlink traffic.

Let it be noted that these assumptions limit the flexibility of the system to some extent. However, it may become apparent to those skilled in the art that the respective limitations are not inherent to the system and are just chosen for both reasons: to allow a simplified description of the principal operation and to show one possible application of the exchange system. More sophisticated schemes of controlling the flow of data traffic and the current load of the interlink bus system may be designed on this basis of specified requirements, e.g. specialized use of different switching blocks in an exchange system.

Each destination routing table 192 is composed of plurality of entries each assigned to a respective one of the virtual channels which are fixedly allocated to an individual remote switching block. Therefore, each entry contains in a field 193 a virtual channel number VC#. Each entry furthermore is provided with a second field 194 bearing the number of the interlink-bus interface unit IBI# which is thus fixedly associated with this virtual channel.

It is indicated in the drawing that the first twelve virtual channels of the local switching block are designed for communicating with a first remote switching block SB 1 whereas another group of twelve virtual channels is associated with the (n−1)-th switching block SB (n−1). The number of members of a group of virtual channels in FIG. 19 is limited for description only and does not really reflect a practical implementation, as may easily become apparent in recalling that a maximum system configuration of 63 switching blocks and an amount of 4,032 virtual channels in each switching block has been supposed. For the same reasons the organizational scheme of the destination routing tables reflects a system configuration including just four interlink buses BUS and four local interlink-bus interface units IBI, accordingly. Despite these limitations in the drawings, the principal organizational scheme of allocating virtual channels to a remote switching block, on the one hand, and a local interlink-bus interface unit IBI, on the other hand, is clearly indicated. By way of an example, virtual channels 1, 5 and 9 are designated for inter-system communication with the first remote switching block SB 1 via the same local interlink-bus interface unit IBI 1. The same interlink-bus interface unit IBI 1 also is used for inter-system communication with the remote switching block SB (n−1) via virtual channels 13, 17 and 21.

Each of the entries of a destination routing table 192 furthermore contains a one-bit field 195 for a marker bit MB. The "1" state of the marker bit indicates that the respective virtual channel is already occupied. If a virtual channel is not allocated to an individual call, the respective marker bit MB is reset to zero.

Whenever a communication link between a local switching block-associated with a calling party—and a remote switching block—associated with a called party—has to be established, the following operation procedures will be performed: designated by the dial code, the number of the remote switching block SB# and the number of the line terminator (remote LT#) is locally available. Based upon the remote switching block number, the respective destination routing table 192 in the local main memory MM is selected. The entries of this table are sonsecutively scanned whereby the state of each marker bit MB is checked. The first entry found with a marker bit in a zero condition designates a virtual channel which has not yet been assigned to an inter-system communication call. The number of this virtual channel VC# and the number of the local interlink bus interface unit IBI# are read out non-destructively and transferred to the direction memory 820 (FIG. 15) of the local virtual channel controller VCC. Storing these items of control information in the direction memory means that a virtual channel has been allocated to the calling party for the desired interlink communication. The marker bit of the respective entry of the selected destination routing table 192 is set to its "1" condition, thus preventing a further selection of the virtual channel until the respective links are dissolved by a call-release routine which determines, among others, the local central processor CP to control resetting of the marker bit condition.

Having established a communications link between two switching blocks based upon stored information in the direction memory 820 in one traffic direction the respective measures have to be taken to set up the communications link for the opposite traffic direction. The call request is extended to the remote switching block. The extended call request initiates in the remote switching block similar routines of assigning locally another vitual channel to the call and returning this data to the calling switching block for cross-connecting both switching blocks.

Once this link has been established the selection information packet is sent by the local switching block to the remote switching block. The remote switching block routes the call to one of its own line terminators LT and returns the call connect packet to the calling switching block. During the set-up phase, the call is permanently associated with a particular interlink-bus interface unit IBI in each switching block. All data referring to a call are transmitted via those interlink-bus interface units to insure that all characters comprising the packets will be received in proper order.

After the set-up information has been exchanged, each switching block establishes a cross-connect in its own virtual channel controller VCC. The connection memories of the communications controllers CC are left in the status for a call set-up simulating that data and status have to be sent to the central processor CP, thus the virtual channel controller has a possibility to intercept data. However, the contents of the direction memory of the virtual channel controller is updated to determine the cross-connection by the stored remote switching block number and the remote virtual channel number. The local switching block number and the local virtual channel number are cross-connected to the local line terminator LT. Thus, the communications controller CC continues to feed data towards the associated central processor CP. The respective local virtual channel controller VCC intercepts the data as described and transfers it to the selected interlink-bus interface unit IBI. Likewise on data comming from the cross-connected remote virtual channel, the virtual channel controller VCC directs the data to the communications controller CC as if it were comming from the local central processor.

The path of each character from the calling party in forward signalling direction is from the subscriber line via the local line terminator LT, the communications controller CC the virtual channel controller VCC to the selected local interlink-bus interface unit IBI. The message is transmitted between the local interlink-bus interface unit IBI and the remote interlink-bus interface unit via one of the interlink-buses BUS. The data path of characters in the remote switching block corresponds to that path in the local switching block; it is from the interlink-bus interface unit via the virtual channel controller VCC, the communications controller CC and the line terminator LT to the called terminal.

The central processor CP sending data or commands to either a line terminator LT or an interlink-bus interface unit IBI utilizes the same commands as with the conventional exchange system except one previously unused bit in the data word which is set into state "1" designating an interlink communication. If this bit is not set, data sent to a communications controller CC passes the virtual channel controller VCC unaltered. Information from the communications controller CC can be sent either to the local central processor CP, the remote central processor CP or both. The determination is made by the virtual channel controller VCC based upon the operation code of the respective command, the content code and the contents of the information disposition field of an entry in the virtual channel number table.

Signalling For Inter-Switching Block Calls in Details

The described summary of operations for establishing links of an interlink call may be the basis of the following detailed description of an example of an interlink connection. Let it be assumed that the call originated from a local line terminator LT 100 of the local switching block SB 1 and is to be extended to a remote line terminator LT 400 of the remote switching block SB 4. The terms "local" and "remote" are consistently used as to be seen from either the point of view of the calling or the called party. If the direction of data traffic is of concern reference will be made to equipment associated with the calling party and the called party, respectively. For further clarification, in this example, any device additionally designated by "1" will belong to the equipment associated with the calling party and any device additionally designated by "4" will belong to the equipment of the called party.

The line terminator LT 100, associated with the calling party, handles the call request and the selection information as it would do just for local data traffic. Upon receipt of an end-of-selection signal, the central processor CP 1 associated with the calling party's switching block SB 1, is activated to process the selection information. During the selection look-up by this central processor CP 1 the dial code is analyzed and it is detected that the code points to the remote switching block SB 4. During dial code analysis the respective destination routing table is addressed and, as described, a virtual channel number VC#55, for example, is assigned under control of the central processor CP 1.

This local virtual channel number VC#55 is sent to virtual channel controller VCC 1 together with the remote switching block number SB#4 and with an operation code. The received information is evaluated by the transfer control unit of the local virtual channel controller VCC 1 as a call request command. The respective entry of the virtual channel number table in the direction memory is updated by storing the remote switching block number SB#4 and the number of the local interlink-bus interface unit IBI 1 which has been assigned to the call.

A call request is then initiated by the central processor CP 1 and placed on the interlink-bus BUS together with the remote switching block number SB#4, the local switching block number SB#1 and the local virtual channel number VCC#55. The message is intermediately stored in the IBI data buffer of the interlink-bus interface unit IBI 4 associated with the switching block SB 4 of the called party and then transmitted to the central processor CP 4. This central processor CP 4 recognizes this information as a call request from another switching block and assigns a free call block-as conventional-and a free local virtual channel number VC#75, for example, to the call. The central processor CP 4 then transmits a call confirm command to its associated virtual channel controller VCC 4 where the selected entry (VC#75) of the virtual channel number table is updated by storing the remote virtual channel number VC#55 and the remote switching block number SB#1.

Thereupon, a message is placed on the interlink bus with the following information: the remote switching block number SB#1, the remote virtual channel number VCC#55, i.e. address control information referring to the calling party, on the one hand, and the local switching block number SB#4 and the local virtual channel number VC#75, i.e. address control information referring to the called party, on the other hand.

The virtual channel controller VCC 1 associated with the calling party intercepts this message and transfers it to the local central processor CP 1 which controls updating of the local direction memory by storing the remote virtual channel number VC#75 in the virtual channel number table 821 (FIGS. 15 and 16). Additionally, the call state in the call block is updated. The system is now ready to send selection information to the remote switching block SB 4.

The sequence of events described above will cause a transparent communications link from the central processor CP 1 of the calling party to the central processor CP 4 of the called party via the both virtual channel controllers VCC 1 and VCC 4, interlink-bus interface units IBI 1 and IBI 4 and the interlink-bus, BUS, wherein "transparent" means that each central processor CP 1 and CP 4 can now send data by use of their respective local virtual channel numbers VC#55 and VC#75.

For selection of the called terminal, the central processor CP 1 associated with the switching block SB 1 of the calling party, transfers a selection information packet to the remote central processor CP 4 of switching block SB 4. Besides the selection digits additional data may be transferred which describes the type of the requested call, i.e. the class of service and can contain various flag bits which may designate optional features of the system to be used. Further information can be included if call record journalling has to be performed by the remote switching block, since in such a case full information about the calling party has to be given.

A successful reception of the information packet will trigger the transmission of an acknowledgement character from the switching block SB 4 of the called party to the switching block SB 1 of the calling party. If the parity or check-sum test fails, the remote switching block SB 4 sends instead a no-acknowledgement character and the switching block SB 1 of the calling party will repeat the packet. The central processor CP 4 of switching block SB 4 of the called party stores the selection packet information in its associated call block. Upon reception of the end of packet character, the normal local selection routine is started for determining the called terminal or trunk. If the called party's line is available, the central processor CP 4 will exchange signals with the called party as normal.

If the call extension to the called party is successful a call-connect packet is transmitted from the switching block SB 4 associated with the called party to the switching block SB 1 in backward signalling direction using the same principle as with the transmission of the selection packet. The call-connect packet is sent out with address information SB#1, VC#55 and consists of the local virtual channel number VC#75 and different flag bits which depend on the type of service performed or requested. The central processor CP 1 of the calling party's switching block SB 1 stores the call-connect packet information in its call block and sends an acknowledgement signal to the remote switching block SB 4 which proceeds to cross-connect the call.

Having received that acknowledgement signal, the central processor CP 4 of the switching block SB 4 will trigger the complete set up of entries in the associated direction memory. Respective entries of the line terminator table 822 (FIGS. 15 and 17) and the virtual channel number table 821 (FIGS. 15 and 16) are now updated, such that the called line terminator LT 400 is linked to the remote switching block SB 1 and the remote virtual channel VC 55 of the calling party and the local virtual channel VC 75 is linked with the local line terminator LT 400.

For performing interlink communication, the connection memory of the communications controller CC of the called party's switching block SB 4 is left in the so-called set-up mode, whereby the communications controller CC is kept in a status as if it still had to send information-data and status data-to the associated central processor CP. Once this has been accomplished, the call block, containing all information necessary to recover a call from a system failure, is read out from the main memory of the central processor unit into the peripheral data base.

Once the central processor CP 1 of the calling party's switching block SB 1 recognizes the end of packet indication, it sends a call-connect signal or message to the calling terminal. After this local routine has been completed in a conventional manner, the line terminator LT 100 of the calling party is cross-connected with the remote switching block SB 4 and the remote virtual channel VC 75, on the one hand, and the local virtual channel VC 55 is cross connected with the local line terminator LT 100, on the other hand. This is achieved by the updated entries in the local direction memory as has been described with respect to the same procedure in switching block SB 4 of the called party. If an answer-back of the called party is to be requested at cross-connect time, the local central processor CP 1 of the calling party's switching block SB 1 will do so and will write the call block into the associated data base as soon as the first character of the answer-back arrives.

An unsuccessful try to extend a call within the called switching block SB 4 will be signalled to the calling switching block SB 1 by transmitting a service character. This character, when received by the switching block SB 1 will cause one of the following reactions, depending upon optional features of the data exchange system: the calling party will be cleared with a service text; the call will be tried again; or the call will be connected to a delayed delivery service. In addition, the service text character will be confirmed by clearing signals in both switching blocks, thus the virtual channels will be released and the respective entries in the direction memories will be reset to free state.

After the entire message has been transferred from the calling party to the called party the communication link has to be disconnected. A disconnect can be initiated by either party. A disconnect is signalled by a return to permanent start polarity of the line which wants to disconnect. A line is considered to have disconnected if it returns to and maintains start polarity for at least 450 ms. In such a case a data character comprising above all of a start bit is received by the local central processor which starts a timer. If the line does not reverse polarity before the timer expires, the condition is interpreted as a true disconnect.

Assuming that the disconnect is initiated by the calling party, the polarity reversal is transferred to the cross-connected switching block SB 4 which forwards it to its associated line terminator LT 400. If this did not take place the disconnect would be delayed by 450 ms for each switching block involved in the call.

Timing is performed only by the central processor CP which is locally associated with the line terminator LT that generated the clearing signal. This avoids timing on virtual channels which would be relatively complicated in view of necessary hardware. If the timer expires before the polarity returns to stop, in the assumed case, a clear confirmation is sent to the remote switching block. This causes the clearing procedure to continue. When clearing confirmation is returned to the local central processor, timing for a clearing confirmation of the remote line terminator is started and resets of the respective entries in the direction memories of the virtual channel controllers and the connection memories of the communications controllers as discussed above, are performed. Thereupon, the local central processor sends a clearing confirmation to its associated line terminator and reads the buffered call block from the data base and resets entries in the direction memory and the connection memory.

If the stop polarity returns before the timer expires, the call is interpreted to be clear and the current polarity reversal is forwarded to the remote switching block which, in turn, will forward this signal to its associated line terminator for restoring the original cross-connect condition.

The described call set up procedure based upon an example of the through-connection from a calling party's switching block SB 1 via its virtual channel VC 55 to the called party's switching block SB4 and vice versa across the virtual channel VC 75 to switching block SB1 reflects the basic characteristic of the exchange system according to the present invention which has no pre-allocated connections among different switching blocks.

This flexibility inherent to the system has been limited to some extent, as has been pointed out and is evident from the composition of the destination routing tables in FIG. 19. The final consequence of this limitation has been disregarded yet in the described embodiment for the obvious reason of disclosing the general procedures for a call set-up and a call-connect.

It will, however, be apparent to those skilled in the art that the assumed limitation expressed by the composition of the destination routing tables in FIG. 19, in fact, can be interpreted as a pre-arranged fixed relationship between one virtual channel and a remote switching block, on the one hand, and an interlink-bus, on the other hand. If the virtual channel number tables are not set up dynamically these fixed relationships can be utilized advantageously to reduce the outlay of control, the memory capacity and the number of information transfers for storing purposes, etc. In such a case destination routing table does not have to be provided with a format including a number for an interlink-bus interface unit, since this number is statically allocated and can be fixedly stored in the virtual channel number table directly. Also a direct relationship between the local virtual channel number and a remote virtual channel number can be established, since both the local and the remote switching blocks have the same amount of virtual channels for communicating with each other. For both directions, the virtual channels can be specified such that the same respective lines of a trunk group across the interlink-bus system are utilized, whereby these lines are proportionally distributed over the different parallel interlink-buses and are designated by a virtual trunk group number rather than a remote switching block number.

Taking advantage of these consequences a call set-up can be controlled much more easily, since a virtual channel number which has been assigned locally to a call in calling direction directly also specifies the trunk group, i.e. the remote switching block and the corresponding remote virtual channel are assigned indirectly. Updating of cross-connection tables then can be reduced to updating the line terminator number table. Accordingly, also the format of tables shown in FIGS. 16, 17 and 19 can be reduced and several transfers of control information during the call set-up phase simply include acknowledgement signals.

There has thus been shown and described a novel modular telecommunication system for exchanging data between any pair of a multiplicity of data terminals, i.e. subscribers or trunks which fulfills all the objects, and advantages sought therefore. Many changes, modifications, variations and other uses and applications of the subject invention will, however, become apparent to those skilled in the art after considering the specification and the accompanying drawings, which disclose preferred embodiments thereof. All such changes, modifications, variations and other uses and applications which do not depart from the spirit and scope of the invention are deemed to be covered by the invention which is limited only by the claims which follow.

What is claimed is:

1. In a modular telecommunication system for exchanging data between any pair of a multiplicity of data terminals, said telecommunication system including a plurality of switching blocks and a plurality of interconnecting lines for interconnecting any pair of said switching blocks, each of said switching blocks adapted to be connected to a respective group of data terminals, and including:
    (a) line terminators each adapted to be connected to a respective one of said data terminals;
    (b) a communications controller for controlling local data exchange within the switching block between pairs of said line terminators across real channels;
    (c) a central processing system coupled to said communications controller for setting up switching operations within said communications controller; and
    (d) an interface unit connected to said interconnecting lines for providing remote data exchange between a locally associated data terminal and a data terminal associated with a different, remote one of said switching blocks, the improvement comprising: a virtual channel controller arranged in each switching block for controlling said remote data exchange, and being connected to said central processing unit, said communications controller and said interface unit for switching information from either one of these devices connected thereto to the others in such a manner that said virtual channel controller, while being transparent for local data traffic across real channels, establishes additional data links by means of virtual channels for extending data exchange between any pair of a locally associated data terminal and a data terminal associated with a respective one of said remote switching blocks across said interconnecting lines.

2. The modular telecommunication system as recited in claim 1, wherein each of said virtual channel controllers comprises:
    input ports and output ports both connected to said communications controller, said central processing system and said interface unit;
    a data transfer control unit having inputs connected to said input ports for receiving transfer request signals from said devices connected thereto, and having control outputs;
    buffered data switches arranged between said input ports and said output ports for selecting temporary individual data paths and having control inputs connected to said control outputs of said transfer control unit; and
    a direction memory including a virtual channel number table and a line terminator number table, wherein each entry of said virtual channel number table is associated with one of said virtual channels and contains cross-connecting control information for assigning incoming data to a respective one of the local line terminators, and wherein each entry of said line terminator number table is associated with a local line terminator and contains cross-connecting control information for assigning outgoing data to a respective one of the virtual channels of a remote switching block.

3. The modular telecommunication system as recited in claim 2, wherein said entries of said line terminator number table further comprise address information for selecting a remote switching block and a remote virtual data channel, which address information is obtained from the local central processor system during the set-up phase of a line connection.

4. The modulator telecommunication system as recited in claim 1, wherein said interconnecting lines further comprise a plurality of interlink buses connected in parallel to each of said switching blocks, and wherein each of said switching blocks comprises a plurality of interlink-bus interface units, each associated with a respective one of said interlink buses.

5. The modular telecommunication system as recited in claim 4, wherein each interlink bus further comprises:
    a first set of parallel connecting lines provided for transmitting data information;
    a second set of parallel connecting lines provided for transmitting a virtual channel number;
    a third set of parallel connecting lines provided for transmitting a switching block number; and
    a fourth set of parallel connecting lines provided for transmitting address control information based upon which information one of said switching blocks being coupled to said interlink bus is temporarily selected for sending information across said interlink bus.

6. The modular telecommunication system as recited in claim 4, further comprising interlink bus controllers each associated with one of said interlink buses for controlling independently time multiplexed data communication between pairs of switching blocks.

7. The modular telecommunication system as recited in claim 6, wherein each of said interlink bus controllers comprises:
    means for generating address control signals such that addresses for consecutively selecting said switching blocks are incremented by one in a cyclic sequence, and said means having outputs connected to said fourth set of parallel connecting lines.

8. The modular telecommunication system as recited in claim 7, wherein each of said interlink bus controllers further comprises means for generating a strobe pulse train timely synchronized with the train of said address control signals in such a manner that each strobe pulse determines a time span during which the signals occurring on said first, second and third set of connecting lines are validated for being received by a respective switching block currently selected by means of said switching block number.

9. In a method of controlling data exchange in a modular telecommunication exchange system between any pair of a multiplicity of data terminals, said telecommunication system including a plurality of switching blocks and a plurality of interconnecting lines for interconnecting said switching blocks, each particular one of said switching blocks adapted to be connected to a respective group of data terminals and having:
   (a) line terminators adapted to be connected to a respective one of said data terminals;
   (b) a communications controller for controlling local data exchange within the particular switching block between pairs of said line terminators across real channels;
   (c) a central processing system coupled to said communications controller for setting up switching operations within said communications controller; and
   (d) an interface unit connected to a respective one of said interconnecting lines for providing remote data exchange between a locally associated data terminal and a data terminal associated with a different, remote one of said switching blocks, the improvement comprising the steps of:
   analyzing a dial code number associated with a call request of a calling party of said central processing system receiving said call request to determine whether the data terminal of the called party is associated with one of said remote switching blocks, and in this case, interlink communication between two switching blocks has to be performed;
   assigning locally a virtual channel to the call if it requires interlink communication, thereby establishing a remote communication link between the local data terminal of the calling party and the remote switching block associated with said called party across said interconnecting lines in forward direction;
   transmitting the call request across said remote communication link to said remote switching block associated with the called party;
   assigning also a virtual channel to the call in said remote switching block associated with the called party, thereby establishing a further remote communication link between the data terminal of the called party and the switching block associated with the calling party across said interconnecting lines in backward direction;
   exchanging data control information concerning the respective locally selected virtual channels between both switching blocks and storing said control information in the respective virtual channel controller arranged in the switching block receiving said control information thereby cross-connecting the data terminal of the calling party across the switching block associated with the calling party, said interconnecting lines, the switching block associated with the called party to said data terminal of the called party and vice versa and thereby completing a call set-up phase.

10. The method as recited in claim 9, wherein said central processing system is released after said call set-up phase, and data exchange between data terminals both locally associated with the same switching block during a call-connect phase is independently controlled by said communications controller associated with both data terminals, while said virtual channel controller is transparent, whereas for data exchange requiring interlink communication the communications controller of the calling party's switching block while being left in call set-up mode directs data from said calling party's data terminal to the locally associated central processing system via the respective virtual channel controller, and said virtual channel controller intercepts such data transfer and controls instead transmitting of respective data across said interconnecting lines.

11. The method as recited in claim 10, wherein data exchange requiring interlink communication is controlled by the virtual channel controllers each associated with a respective one of the switching blocks cross-connected by said remote communication links based upon control information which is stored in a respective one of direction memories each being arranged in the virtual channel controllers of said cross-connected switching blocks and each including:
   a virtual channel number table for routing incoming data and having entries each assigned to a respective one of the local virtual channels including a field for a line terminator number pointing to one of said locally associated line terminators; and
   a line terminator number table for routing outgoing data having entries each assigned to a respective one of said locally associated link terminators including a field for a virtual channel number pointing to the remote virtual channel which has been assigned to the respective call.

12. The method as recited in claim 11, wherein the call set-up routine comprises the steps of:
   activating said local central processor system upon receiving a call request from one of said local line terminators associated with the data terminal of the calling party;
   evaluating the type of call request depending upon said dial code number by said local central processor system and determining if said call request requires interlink communication and has to be extended to a respective one of said remote switching blocks;
   assigning in such a case a free local virtual channel and an interlink bus to said call request under control of said local central processor system by updating a respective entry of said virtual channel number table by entering an interlink bus number and a number pointing to said remote switching block;
   transmitting the call request to the remote switching block associated with the data terminal of the called party via the selected interlink bus together with control information including said number pointing to said remote switching block and said assigned virtual channel number of the calling party;
   upon receiving said information at the switching block of the called party, interpreting this information as a call request from a remote switching block by the central processor system of said called party's switching block;
   assigning to the call in said called party's switching block again a local virtual channel number and a further interlink bus number by correspondingly updating the respective entry of the virtual channel number table in said called party's switching block with a further interlink bus number and the number of the switching block associated with the calling party;

responding to said call request by returning the switching block number and the virtual channel number of the calling party as address information and transmitting control information including said virtual channel number of the called party for updating the respective entry of the virtual channel number table in said calling party's switching block;

sending selection information from the switching block of the calling party to the switching block of the called party across the selected interlink bus together with control information identifying the line terminator associated with the data terminal of the called party;

proceeding in the call set-up locally in the switching block of the called party and—if the called data terminal is available—updating the respective line terminator number table and the respective virtual channel number table for establishing communication links between the selected virtual channel and the line terminator of the called party in the virtual channel number table, on the one hand, and said line terminator of the called party and said remote switching block number and said remote virtual channel number of the calling party in the line terminator number table, on the other hand;

returning an acknowledgement signal to the switching block of the calling party; and proceeding with the call set-up in the switching block of the calling party by establishing corresponding communication links in the virtual channel number table and the line terminator number table of the calling party;

whereupon the central processor systems of both cross-connected switching blocks are released during the following call-connect phase and the control of data traffic is handed over to the respective virtual channel controllers of both switching blocks.

13. The method as recited in claim 12, wherein the assigning of a free local virtual channel further comprises the steps of:

addressing a destination routing table associated with the switching block of the remote party and arranged in the main memory of the central processor system of the local switching block under control of the same central processor system by means of a pointing address generated during dial code analysis, wherein said destination routing table includes an entry for each virtual channel assigned for forming a communication link from the local switching block to the remote switching block;

scanning consecutively said entries of said destination routing table and checking if the respective virtual channel is presently unoccupied;

selecting the entry of the first available virtual channel;

reading therefrom the number of the virtual channel and, transmitting the same to the local virtual channel controller; and storing in an entry of the local direction memory determined by said transmitted virtual channel number the number of the remote switching block.

14. The method as recited in claim 9, wherein said interconnecting lines are selected by an interlink-bus interface number and incorporate an interlink bus system including several interlink buses and interlink-bus interface units each associated with an interlink bus, on the one hand, and a switching block, on the other hand, for establishing interlink communication between two switching blocks; and wherein data transfer across each of said interlink buses is independently controlled by a respective one of bus controller units each associated with one of said interlink buses.

15. The method as recited in claim 14, wherein said controlling of data transfer across an interlink bus further comprises the steps of:

consecutively scanning said interlink-bus interface units by means of address control signals for a transfer request and enabling access of the selected interlink-bus interface unit to the associated bus during the scanning time span;

transmitting a data word in parallel from said selected interlink-bus interface unit across said interlink bus including control information for addressing the receiving remote switching block; and constantly evaluating the condition of bus lines of said interlink bus carrying said address control information by all interlink-bus interface units associated with said interlink bus, thus enabling the addressed remote interlink-bus interface unit to be activated for receiving said transmitted data word during a time span which is determined by a bus strobe signal.

16. The method as recited in claim 15, wherein said controlling of data transfer across an interlink bus further comprises the steps of:

intermediately storing said received data word in said interlink-bus interface unit; and transferring the locally data word to said associated virtual channel controller upon request by said controller unit.

17. The method as recited in claim 14, wherein said controlling of data transfer across an interlink bus further comprises the steps of:

consecutively scanning said interlink-bus interface unit for a transfer request by said buffer control unit associated with the respective one of said interlink buses;

interrupting said scanning cycle as soon as in response to scanning of an interlink-bus interface unit a transfer request is received;

enabling access of the requested interlink-bus interface unit to the associated interlink bus for sending data;

transmitting a data word in parallel from said selected interlink-bus interface unit across said interlink bus including control information for addressing the receiving remote switching block;

constantly evaluating the condition of address control lines of said interlink bus carrying said address control information for all interlink-bus interface units associated with said interlink bus; and enabling the addressed remote interlink-bus interface unit to receive the transmitted data word during a time span which is determined by a bus strobe signal generated by said bus controller unit for validating the currently transmitted data word.

* * * * *